US009726142B2

(12) United States Patent
Fievez et al.

(10) Patent No.: US 9,726,142 B2
(45) Date of Patent: Aug. 8, 2017

(54) DEPLOYMENT SYSTEM

(71) Applicant: CETO IP Pty Ltd., North Fremantle, Western Australia (AU)

(72) Inventors: Jonathan Pierre Fievez, Melville (AU); Laurence Drew Mann, Kardinya (AU); Daniel Bryan Taylor, Thornlie (AU)

(73) Assignee: CETO IP PTY LTD., Fremantle, Western Australia (AU)

( * ) Notice: Subject to any disclaimer, the term of this patent is extended or adjusted under 35 U.S.C. 154(b) by 161 days.

(21) Appl. No.: 14/780,213

(22) PCT Filed: Mar. 28, 2014

(86) PCT No.: PCT/AU2014/000340
§ 371 (c)(1),
(2) Date: Sep. 25, 2015

(87) PCT Pub. No.: WO2014/153618
PCT Pub. Date: Oct. 2, 2014

(65) Prior Publication Data
US 2016/0053738 A1 Feb. 25, 2016

(30) Foreign Application Priority Data
Mar. 28, 2013 (AU) .............................. 2013901163

(51) Int. Cl.
F03B 13/18 (2006.01)
F03B 13/22 (2006.01)
F03B 13/20 (2006.01)

(52) U.S. Cl.
CPC ............ F03B 13/189 (2013.01); F03B 13/20 (2013.01); F03B 13/22 (2013.01);
(Continued)

(58) Field of Classification Search
CPC ........ F03B 13/189; F03B 13/20; F03B 13/22; F05B 2230/60; F05B 2240/95; F05B 2240/97; F05B 2270/18
(Continued)

(56) References Cited

U.S. PATENT DOCUMENTS 3,515,889 A * 6/1970 Kammerer ............ F03B 13/187
290/53
4,389,843 A 6/1983 Lamberti
(Continued)

FOREIGN PATENT DOCUMENTS

| JP | H09-58575 A | 3/1997 |
| WO | 9928623 | 6/1999 |

(Continued)

OTHER PUBLICATIONS

Supplementary European Partial Search Report for EP Application No. 14 77 6501 mailed Oct. 6, 2016 (9 pages).
(Continued)

Primary Examiner — Jorge Leon, Jr.
(74) Attorney, Agent, or Firm — Merchant & Gould P.C.

(57) ABSTRACT

A wave energy conversion system for harnessing wave energy in a body of water and converting the harnessed wave energy to pressurized fluid, and also a method of deploying such a wave energy conversion system. The wave energy conversion system comprises a unit including a buoyant structure responsive to wave motion, at least one pump and at least one tether adapted to be operably connected between the pump and a fixture below the unit, whereby movement of the buoyant structure relative to the fixture in response to wave motion converts harnessed energy to pressurized fluid. The unit is adapted to be deployed by moving the tether into coupling engagement with the fixture upon actuation of the pump in a manner causing movement of the tether into engagement with the fixture.

29 Claims, 30 Drawing Sheets

(52) U.S. Cl.
CPC ....... *F05B 2230/60* (2013.01); *F05B 2240/95* (2013.01); *F05B 2240/97* (2013.01); *F05B 2270/18* (2013.01); *Y02E 10/38* (2013.01)

(58) Field of Classification Search
USPC ....... 60/496, 497, 500, 504, 505; 290/42, 53
See application file for complete search history.

(56) References Cited

U.S. PATENT DOCUMENTS

| | | | |
|---|---|---|---|
| 4,754,157 A | 6/1988 | Windle | |
| 6,229,225 B1 | 5/2001 | Carroll | |
| 8,209,973 B1 | 7/2012 | Frich | |
| 2005/0236840 A1* | 10/2005 | Stark | B01D 61/10 290/53 |
| 2010/0308589 A1* | 12/2010 | Rohrer | F03B 13/188 290/53 |
| 2012/0317970 A1 | 12/2012 | Edvardsen | |
| 2014/0265339 A1* | 9/2014 | Dehlsen | F03B 13/18 290/53 |

FOREIGN PATENT DOCUMENTS

| | | |
|---|---|---|
| WO | 03/014561 A1 | 2/2003 |
| WO | WO 2007/019640 | 2/2007 |
| WO | WO 2008/052286 | 5/2008 |
| WO | 2009076712 | 6/2009 |
| WO | WO 2009/076712 | 6/2009 |
| WO | WO 2009/076714 | 6/2009 |
| WO | WO 2010/067341 | 7/2010 |
| WO | 2010115241 | 10/2010 |
| WO | WO 2010/115241 | 10/2010 |
| WO | 2011/065838 A1 | 6/2011 |
| WO | 2012021926 | 2/2012 |
| WO | 2013/003640 A1 | 1/2013 |

OTHER PUBLICATIONS

International Search Report for International Application No. PCT/AU2014/000340 mailed May 5, 2014 (6 pages).
International Written Opinion for International Application No. PCT/AU2014/000340 mailed May 5, 2014 (6 pages).
Supplementary European Search Report from corresponding EP Application No. 14776501.0 dated Feb. 6, 2017 (15 pages).

* cited by examiner

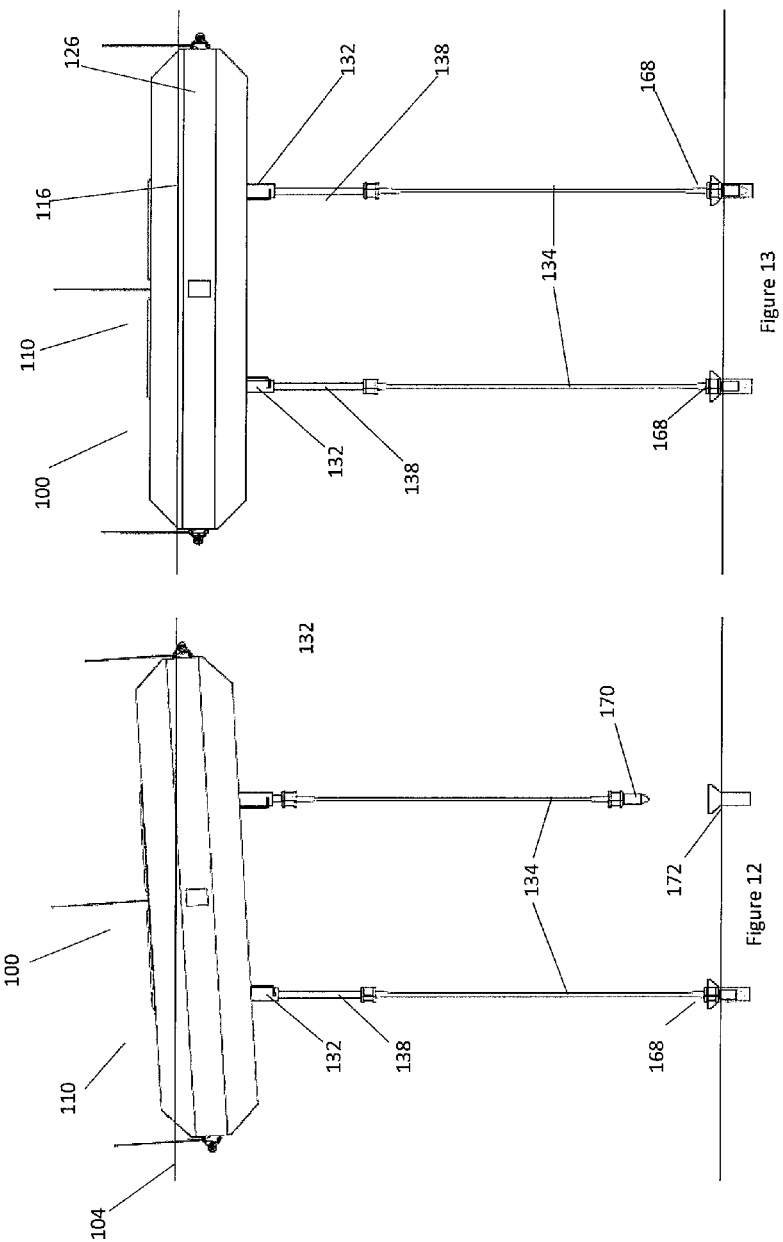

DEPLOYMENT SYSTEM

This application is a National Stage Application of PCT/AU2014/000340, filed 28 Mar. 2014, which claims benefit of Serial No. 2013901163, filed 28 Mar. 2013 in Australia and which applications are incorporated herein by reference. To the extent appropriate, a claim of priority is made to each of the above disclosed applications.

TECHNICAL FIELD

This invention relates to extraction of energy from wave motion, and more particularly to a wave energy conversion system for harnessing wave energy in a body of water and converting the harnessed wave energy to pressurised fluid. In particular, the invention is concerned with deployment of the wave energy conversion system at a site of operation, and preferably also recovery of the wave energy conversion system from that site.

BACKGROUND ART

The following discussion of the background art is intended to facilitate an understanding of the present invention only. The discussion is not an acknowledgement or admission that any of the material referred to is or was part of the common general knowledge as at the priority date of the application.

The Applicant has developed or at least proposed various systems for harnessing wave energy in a body of water and converting the harnessed wave energy to pressurised fluid which typically comprises water drawn from the body of water itself. Where the body of water comprises an ocean, seawater drawn from the ocean may be piped under high-pressure to shore for use. The high-pressure seawater may, for example, be used to drive a turbine and the shaft power from the turbine used to generate electricity. Further, the high-pressure seawater may be fed to a reverse osmosis desalination unit to yield potable water. In such an arrangement, the salt water concentrate exiting the desalination unit, which is still under pressure, may be fed to a turbine and the shaft power used to generate electricity. Typical examples of such wave energy conversion systems are disclosed in WO 2007/019640, WO 2008/052286, WO 2009/076712, WO 2009/076714 and WO 2010/115241.

Such systems have required connection back to shore in the form of high pressure pipelines connecting the unit to a shore based station for processing the high pressure fluid produced. Installation of high pressure pipelines to shore represent a significant cost to these prior art systems. Further, they represent an ongoing risk to the successful operation of these prior art systems as any loss of pressure directly affects operation of the system.

It is against this background, and the problems and difficulties associated therewith, that the present invention has been developed.

SUMMARY OF INVENTION

According to a first aspect of the invention there is provided a wave energy conversion system for harnessing wave energy in a body of water and converting the harnessed wave energy to pressurised fluid, the wave energy conversion system comprising a unit providing a buoyant structure responsive to wave motion, a pump and a tether adapted to be operably connected between the pump and a fixture below the unit, the tether having an end adapted to be connected to the fixture, whereby movement of the buoyant structure relative to the fixture in response to wave motion converts harnessed energy to pressurised fluid, wherein the unit is adapted to be deployed by moving the tether end into coupling engagement with the fixture upon actuation of the pump in a manner causing movement of the tether into engagement with the fixture.

Preferably, the actuation of the pump causes movement of the tether.

Preferably, the wave energy conversion system comprises at least one further pump.

Preferably, the wave energy conversion system comprises at least one further tether.

Preferably, the wave energy conversion system comprises further tethers adapted to be operably connected between further pumps.

Preferably, the further tethers are arranged to be operably connected to further fixtures below the unit. However, other arrangements are possible; for example, there may be a plurality of pumps adapted for connection to a common fixture by a common tether.

In arrangements where there is more than one tether, the tethers may be adapted to undergo movement into engagement with the respective fixtures at substantially the same time.

Alternatively, in arrangement where there are more than one tether, the tethers may be adapted to undergo movement into engagement at different times.

Preferably, the pumps are arranged in groups sharing a common tether.

More preferably, pumps are arranged in operational pairs sharing a common tether.

Preferably, each tether is movable into different configurations; for example, the tether may be movable into a first configuration in which the tether is stowed on the unit to facilitate transit of the unit through the body of water, and into a second configuration in which the tether descends from the unit for coupling engagement with the fixture.

Preferably, the tether is in the first configuration (stowed on the body) when being coupled to and released from the pump.

Preferably, coupling engagement between the tether and the fixture is provided by a coupling assembly comprising first and second coupling portions, one of which is associated with the tether and the other is associated with the fixture.

Preferably, the coupling assembly is operable remotely.

Preferably, the two coupling portions comprise a male coupling portion and a corresponding female coupling portion. Typically, the male coupling portion is associated with the tether and the female coupling portion is associated with the fixture.

Preferably, the fixture comprises an anchor embedded in or otherwise mounted on the floor of the body of water.

Alternatively, the fixture may be buoyant and associated with an anchor embedded in, or otherwise affixed to, the floor of the body of water.

Preferably, the buoyant structure comprises means for varying the buoyancy of the buoyant structure.

Preferably, in arrangements where engagement occurs at different times, the means for varying the buoyancy of the buoyant structure are used to cause different sections of the buoyant structure to descend at different times; for example, the buoyant structure may be caused to assume a tilted disposition with one tether deeper in the water than another tether.

Preferably, the buoyant structure has two operating states, a first state in which the unit can float on the body of water to facilitate transit through the body of water along the surface thereof, and a second state in which the buoyant structure is submerged.

Preferably, the pump is caused to move from an extended condition to a contracted condition to apply a pulling force to cause the unit to move towards the second state; that is, contraction of the pump causes the unit to be pulled into the water.

Preferably, the buoyant structure is caused to move towards the second operating state with the tether in coupling engagement with the fixture upon actuation of the pump.

Preferably, the buoyant structure is caused to move towards the second operating state by application of the pulling force on the tether.

Preferably, the pulling force to move the unit from towards the second operating state is applied between the tether and the buoyant structure.

In one arrangement, the pulling force may cause movement of the unit from the first operating state to the second operating state. In another arrangement, the unit may be caused to move from the first operating state into an intermediate state in which it is either partly or fully submerged, and thereafter the pulling force applied to move the unit from the intermediate state into the second operating state.

Preferably, the buoyant structure is submerged through variation of the buoyancy of the buoyant structure causing a decrease in buoyancy prior to connection of the tether. With this arrangement, the buoyant structure may have a first buoyancy state in which it floats on the body of water and a second buoyancy state in which it is partly or fully submerged in the body of water. The first buoyancy state would typically correspond to the first operating state of the unit.

The unit may, of course, be moved from the first operating state to the second operating state in any other appropriate way; for example, by varying the buoyancy of the buoyant structure to cause the unit to sink from the first operating state to the second operating state.

Preferably, the pump is movable from the contracted condition to the extended condition to allow the unit to move from the second state towards the first state; that is, extension of the pump may allow the unit to rise towards the water surface from the submerged condition. With this arrangement, the unit is allowed to ascend in the water in a controlled manner to return to the water surface.

Preferably, the unit may have provision for maneuverability and steering in the body of water.

Preferably, the unit comprises a propulsion system configured as one or more thruster modules arranged to engage the unit.

Preferably, the thruster modules are removable after installation of the unit at site.

Preferably, the thruster modules are arranged to be adaptively buoyant.

More preferably, the unit comprises an integral propulsion system incorporated within the unit.

Preferably, the integral propulsion system has a drive system incorporating one or more components (such as a power pack) removable after installation of the unit at site.

Preferably, the propulsion system is adapted to assist in the transportation of the unit to, and from, a site of installation, particularly with respect to manoeuvrability and steering control.

Preferably, the unit is adapted to allow towing of the unit to the installation site.

Preferably, energy is extracted from the pressurised fluid, involving the extraction of mechanical energy for conversion to electrical energy.

Preferably, the electricity generated is conveyed from the unit along one or more electrical reticulation lines.

Preferably, the pressurised fluid may also be used to produce potable water from water extracted from the body of water.

Preferably, potable water may be conveyed from the unit along one or more water reticulation lines.

More preferably, control cabling and service lines run with the reticulation lines forming an umbilical.

Preferably, the reticulation lines or umbilical for electricity and/or water run in a catenary descending to run along the floor of the body of water to a destination.

More preferably, the reticulation lines or umbilical run in a catenary to a floating mooring before descending to run along the floor of the body of water to a destination.

Preferably, the reticulation lines or umbilical have distributed along their length a plurality of buoyancy modules arranged such that the reticulation lines or umbilical form a wave like arrangement between the unit and the floor of the body of water before running along the floor of the body of water to a destination.

Alternatively, the reticulation lines or umbilical for electricity and/or water may run to one of the tethers and then descend along the tether to run along the floor of the body of water to a destination. Preferably, the reticulation lines or umbilical run in a catenary to the tether.

In one arrangement, the reticulation lines or umbilical descend along the tether by running alongside the tether.

In another arrangement, the reticulation lines or umbilical descends along the tether through an axial passage within the tether.

Preferably, the body is arranged to have a major and a minor axis, the ratio between the length of the major and minor axis defining an aspect ratio, the aspect ratio being in a range between 1 and 5.

More preferably, the aspect ratio between the major axis and the minor access is between 3 and 4.

Preferably, in configurations where the aspect ratio is greater than 2, there are at least two pumps and at least two associated tethers, the pump and tether combinations being preferably positioned in spaced apart relation along the major axis.

According to a second aspect of the invention there is provided a method of deploying a wave energy conversion system according to a first aspect of the invention.

Preferably, the deployment comprises installation of the wave energy conversion system at an installation site in a body of water.

Preferably, the deployment also comprises subsequent recovery of the wave energy conversion system from the installation site.

According to a third aspect of the invention there is provided a method of deploying a wave energy conversion system comprising:
  establishing a unit comprising a buoyant structure responsive to wave motion, a pump and a tether adapted to be operably connected between the pump and a fixture below the unit, whereby the pump is caused to actuate upon movement of the buoyant structure relative to the fixture in response to wave motion to generate pressurised fluid;

moving the unit to an installation site in a body of water and into a position to locate the tether above a fixture to which it is adapted to be engaged;

actuating the pump to move the tether into engagement with the fixture; and submerging the unit in the body of water.

Preferably, the tether has an end adapted to be connected to the fixture, wherein the movement of the tether end causes coupling engagement with the fixture.

Preferably, there are two pumps and two tethers each adapted for movement into engagement with a respective fixture.

Preferably, the method further comprises positioning each tether in a first configuration in which it is stowed on the unit to facilitate transit of the unit through the body of water, and moving the tether into a second configuration in which it descends from the unit for coupling engagement with the fixture.

Preferably, the method further comprises moving the unit to the installation site with the tethers in the first configuration for at least part of the journey and moving the tether into the second configuration in preparation for coupling engagement with the fixture.

Preferably, the step of moving the unit to the installation site comprises towing the unit for at least part of the journey to the installation site.

Preferably, the step of moving the unit to the installation site comprises the use of a propulsion system attached or arranged within the unit.

Preferably, the method further comprises maneuvering and steering the unit underwater in the second buoyancy state. This step may comprise provision of a propulsion system on the unit and operating the propulsion system to provide the maneuvering and steering action.

Preferably, the step of submerging the unit in the body of water comprises application of a pulling force on the tether.

Preferably, the pulling force is applied between the tether and the unit.

Preferably, the pulling force is applied to the tether by moving the pump from an extended condition to a contracted condition. With this arrangement, the unit is pulled into the water.

Preferably, the unit is moved between the first and second buoyancy states through flow of fluid (preferably water) controlled by a means for varying the buoyancy of the buoyant structure into and out of at least one ballast tank within the buoyant structure.

Preferably, the pressurised fluid comprises a working fluid operable in a closed loop. Alternatively, the pressurised fluid may comprise water drawn from the body of water.

Preferably, the method further comprises extracting energy from the pressurised fluid. Energy may be extracted in any appropriate way, but preferably involves extraction of mechanical energy for conversion to electrical energy. The mechanical energy may comprise shaft power used to generate electricity.

More preferably, the apparatus comprises a hydraulic motor or turbine operable by the pressurised fluid and an electric generator adapted to be driven by the hydraulic motor or turbine.

More preferably, the method further comprises the production of potable water from water extracted from the body of water.

Preferably, the production of potable water comprises the transfer of energy of the pressurised fluid to pressurise a separate stream of seawater to feed a reverse osmosis desalination system.

More preferably, the method comprises extracting seawater from the body of water and feeding the pressurised water directly into a reverse osmosis desalination unit.

Preferably, the method further comprises connecting the unit to an electrical reticulation line to carry the electricity away from the unit.

More preferably, the method further comprises connecting the unit to a water reticulation line to carry the potable water away from the unit.

Even more preferably, the method comprises connecting the unit to a reticulation assembly comprising electrical, water, control and service lines.

The method may further comprise running the reticulation lines or assembly in a catenary to run along the floor of the body of water to a destination.

In one arrangement, the method further comprises running the reticulation lines or assembly in a catenary to a floating tethered mooring and to then descend to run along the floor of the body of water to a destination.

In another arrangement, the method comprises running the electrical reticulation lines or assembly in a catenary to one of the tethers to descend along the tether and then to run along the floor of the body of water to a destination.

In yet another arrangement, the method comprises running the electrical reticulation lines or assembly in a wave like configuration, having distributed along its length a plurality of buoyancy modules.

Preferably, the method further comprises establishing the unit as a body accommodating at least one removable portion.

Preferably, the removable portion comprises the pump(s) for producing the pressurised fluid.

More preferably, the removable portion further comprises the apparatus operable by the pressurised fluid to generate electricity and/or potable water.

Even more preferably, the removable portion may be configured as a module receivable in the body.

Yet even more preferably, the removable portions are arranged to be operably interchangeable.

Preferably, the method further comprises coupling the tether to the pump upon introduction of the removable portion into the body.

Preferably, the method further comprises uncoupling the tether from the pump upon removal of the removable portion from the body.

Preferably, the method further comprises positioning the body to receive the removable portion(s) and installing the removable portion in the body.

Preferably, the body comprises a cavity for receiving the removable portion and the method comprises installing the removable portion in the cavity by lowering it into the cavity through an open top thereof.

Preferably, the method further comprises recovery of the unit from the installation site.

Preferably, for subsequent recovery of the unit, the pump is movable from the contracted condition to the extended condition to allow the unit to rise buoyantly towards the water surface. With this arrangement, the unit is allowed to ascend in the water in a controlled manner to return to the water surface.

According to a fourth aspect of the invention there is provided a wave energy conversion system deployed by a method according to the third aspect of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 12 is schematic side view of a wave energy conversion system being deployed using a fourth embodiment of a deployment system according to the invention, with the buoyant structure being shown in a tilted condition;

FIG. 13 is a view similar to FIG. 12 but with the buoyant structure shown in a subsequent level condition in accordance with the fourth embodiment;

FIG. 28b is a schematic view of the top of the wave energy conversion system of FIG. 28a.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Figure 1:
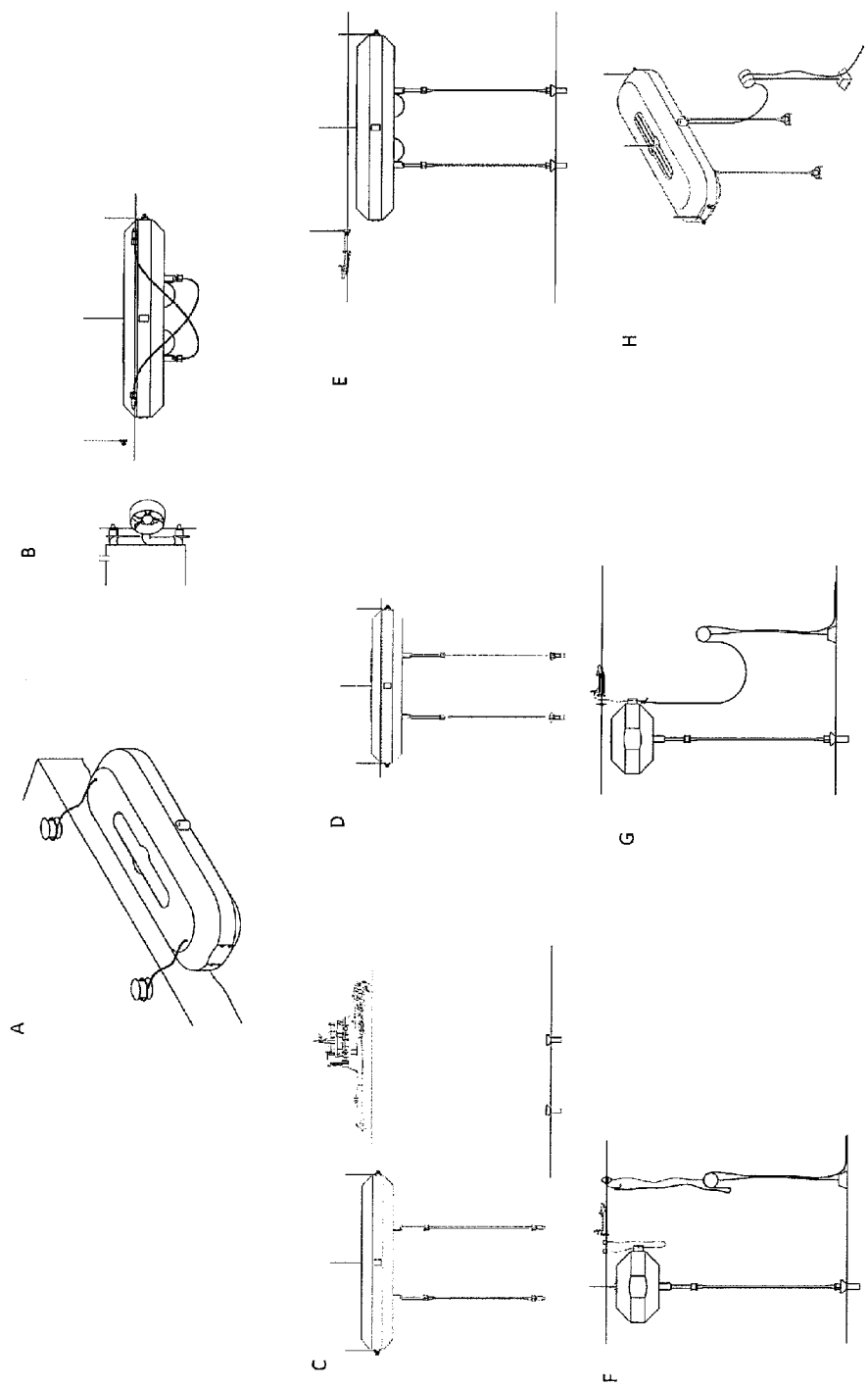
FIG. 1 is a schematic view illustrating sequentially various steps involved in a first embodiment of a deployment system according to the invention, the steps being identified as steps A-H respectively.

Referring to the drawings, the embodiments shown in the drawings are each directed to deployment of a wave energy conversion system 100 in a body of water 102 having a surface 104 and a floor 106. The body of water 102 is typically at sea in which case the floor 106 comprises the sea bed. The deployment involves installation of the wave energy conversion system 100 at an installation site 108 at sea and, as necessary, subsequent recovery of the wave energy conversion system is effected from the installation site.

Referring to FIGS. 1 to 9, there is shown a wave energy conversion system 100 in accordance with a first embodiment of the invention undergoing deployment. The system 100 comprises a unit 110 which provides a buoyant structure 126 responsive to wave motion.

The buoyant structure 126 comprises a body 116 which is configured as a shell 122 having an outer surface 124. The outer surface 124 is configured to be coupled with the body of water when in a submerged condition to respond to wave motion. In the arrangement illustrated in FIG. 9, the buoyant structure 126 is in a submerged condition with the outer surface 124 coupled with the body of water to respond to wave motion, although the body of water is not depicted in that drawing.

In the arrangement illustrated, the body 116 is of an elongate configuration in plan, comprising a major axis and a minor axis. In this embodiment the body has a length along the major axis of 30 meters and a width about the minor axis of 10 meters. However, in accordance with preferred embodiments of the invention, the aspect ratio is within the range of between 1:1 and 5:1. More preferably, the aspect ratio is within the range 3:1 to 4:1.

Other configurations for the body 116 are, of course, possible, including for example a configuration which is substantially circular (an aspect ratio of 1:1) when viewed on plan, as well as various configurations described and illustrated in the Applicant's prior art cases as referred to above.

The wave energy conversion system 100 is operable to harness wave energy at the installation site 108 and convert the harnessed wave energy to pressurised fluid.

Figure 11:
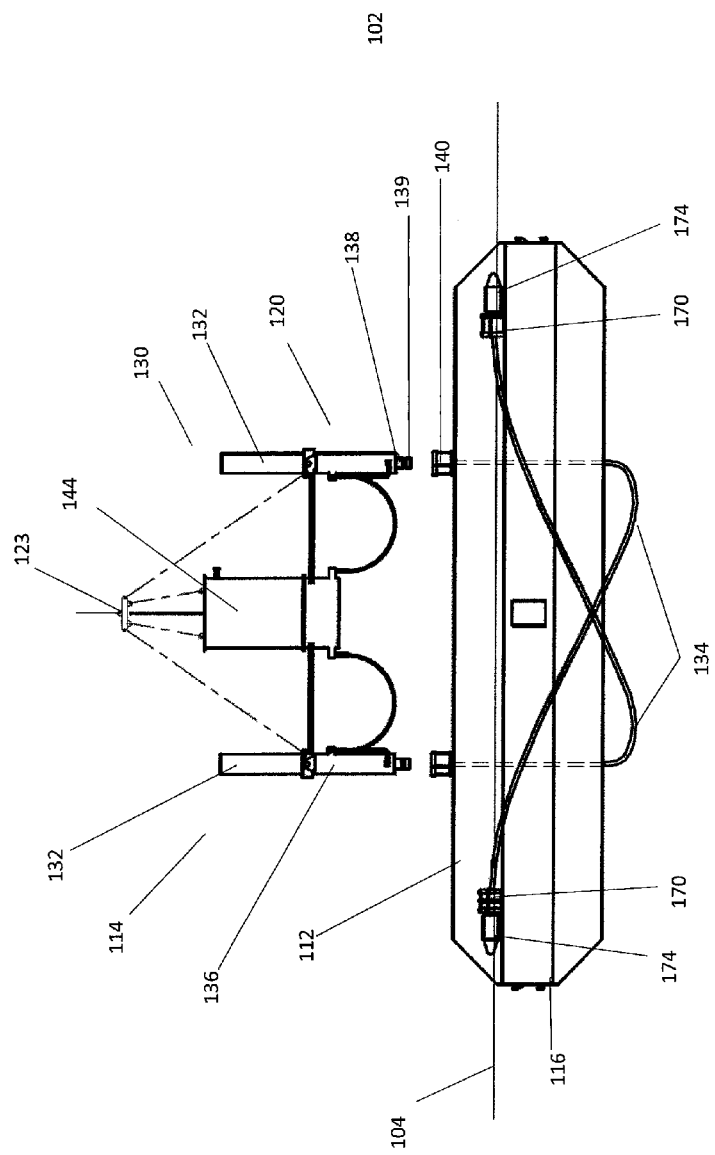
FIG. 11 is a fragmentary schematic view of a portion of a wave energy conversion system being deployed using a third embodiment of a deployment system according to the invention.

Accordingly, the unit 110 incorporates a pumping system 130 operable in response to movement of the buoyant structure 126 relative to the sea floor 106 to generate the pressurised fluid. The pumping system 130 comprises two pumps 132, each adapted to be connected by tether 134 to the sea floor 106. In the arrangement as shown in FIG. 11, the pumping system 130 is configured to be removable, in alternate arrangements, the pumping system 130 could be included as an integral component of the unit 110.

In this embodiment, the pumping system 130 comprises a closed circuit around which a working fluid circulates, the arrangement being that the pumps 132 pressurise the working fluid to provide the pressurised fluid. The working fluid may comprise any appropriate fluid; for example, a liquid such as water or any other suitable type of substantiality incompressible fluid.

In an alternative arrangement, the pressurised fluid may comprise fluid flowing through an open circuit, typically being seawater drawn from the body of water 102.

Each pump 132 has an extended condition and a contracted condition, with the effective length of the pump increasing upon movement from the contracted condition to the extended condition and the effective length of the pump decreasing upon movement from the extended condition to the contracted condition.

Each pump 132 comprises a reciprocating piston pump having a pump body 136 defining a cavity and a piston (not shown) slidably and sealingly mounted with respect to the body for reciprocatory movement with respect to the cavity. With this arrangement, the piston and cavity cooperate to define a pumping chamber (not shown) adapted to undergo expansion and contraction in response to reciprocatory movement of the piston with respect to the cavity. The pump 132 has an inlet (not shown) for receiving low pressure fluid in the closed circuit and an outlet (not shown) for discharging said fluid under pressure (thereby providing the pressurised fluid in the circuit).

A piston rod 138 extends from the piston outwardly from the pump body 136 and is adapted for releasable connection to the respective tether 134. In the arrangement shown, the outer end of each piston rod 138 is provided with a coupling element 139 adapted to be releasably connected to a mating coupling element 140 provided on the top end of the respective tether 134. The pumps 132 are accommodated mostly within the confines of the buoyant structure 126 but protrude somewhat beneath, as shown in the drawings.

With this arrangement, actuation of the pumps 132 through regulation of fluid pressure therein can be used to relatively move the tethers 134 prior to connection of the tethers 134 to the sea floor 106.

Figure 6:
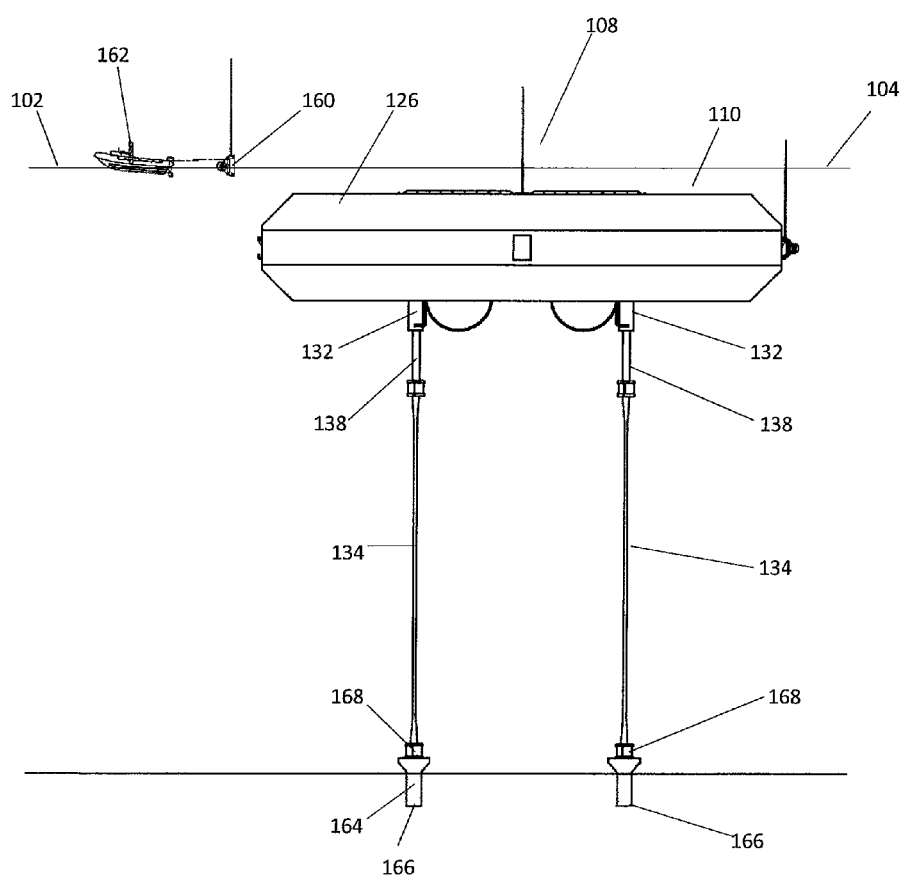
FIG. 6 corresponds to step E and is a view somewhat similar to FIG. 5, with the exception that the unit has been submerged to an appropriate depth within the body of water, with the unit having been released from the towing vessel at an earlier stage.

The tethers 134 are adapted to be anchored to the sea floor 106 by way of fixtures 164 arranged in the sea floor 106 (see FIG. 6). The fixtures 164 each comprise an anchor 166 embedded in the sea floor 106. The anchor 166 may be of any appropriate form well understood by a person skilled in the art. The anchors 166 are installed in the sea floor 106 at appropriate locations prior to delivery of the unit 110 to the installation site 108.

Coupling engagement between each tether 134 and the respective fixture 164 is adapted to be selectively releasable to facilitate subsequent recovery of the unit 110 from the installation site.

The coupling engagement is provided by a coupling assembly 168 comprising first and second coupling portions 170, 172, one of which is associated with the respective tether 134 by being attached to the bottom end 134a thereof, and the other of which is associated with the respective anchor 166 by being secured thereto. In the arrangement shown, the first coupling portion 170 is configured as a male coupling portion and the second coupling portion 172 is configured as a mating female coupling portion.

The coupling assembly 168 may be of any appropriate form, a typical example of which might comprise a subsea connector of the type disclosed in U.S. Pat. No. 8,166,620, the contents of which are incorporated herein by way of reference. Other coupling arrangements can, of course, be used.

Figure 5:
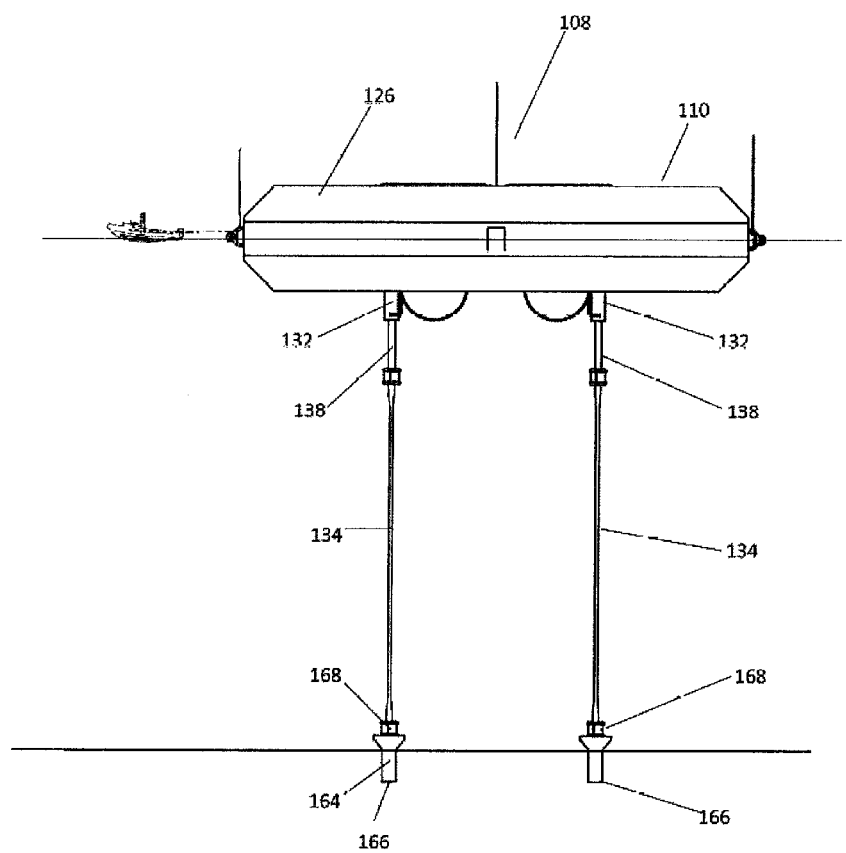
FIG. 5 corresponds to step D and is a schematic side view illustrating the unit anchored to the sea bed.

The tethers 134 are movable through a number of configurations. In a first configuration, as shown in FIG. 3A, the tethers 134 are stowed on the unit 110 to facilitate transit of the unit through the body of water 102. In a second configuration, as shown in FIG. 5, the tethers 134 hang from the unit 110 for coupling engagement with the respective anchors 166.

The tethers 134 are of a pliant construction, examples of possible arrangements include an articulated construction comprising a plurality of rigid sections hingedly connected together or a composite construction comprising a plurality of rigid sections and a plurality of flexible sections disposed alternately along the length of the tether.

It is, however, a most desirable feature that coupling engagement between each tether 134 and the respective anchor 166 can be initiated, and terminated, remotely; that is, without the need for personnel (such as a diver) at the subsea location at which coupling occurs.

As shown, the unit 110 comprises a first apparatus operable by the pressurised fluid to generate electricity, thereby extracting energy from the pressurised fluid as referred above.

Electricity generated by the first apparatus is delivered to an outlet 146 mounted on the exterior of the body 116.

The unit 110 also has provision for production of potable water using the pressurised fluid. This may involve a reverse osmosis desalination system operating to provide potable water. In this embodiment, energy of the pressurised fluid is transferred to pressurise a separate stream of seawater to feed the reverse osmosis desalination system. Other arrangements are, of course, possible; for example, where the working fluid comprises water drawn from the body of water, the pressurised water may be fed directly to a reverse osmosis desalination system to yield potable water.

Further, potable water produced by the reverse osmosis desalination system is delivered to an outlet 148 mounted on the exterior of the body 116. As shown, the two outlets 144, 146 are co-located on the body 116.

The electricity may be conveyed from the unit 110 along one or more electrical reticulation lines connected to the electrical outlet 146. Further, potable water may be conveyed from the unit 110 along one or more water reticulation lines connected to the water outlet 148. The electrical reticulation lines and water reticulation lines are not shown separately in the drawings but rather as depicted as a common reticulation line assembly 150 forming part of a reticulation system 151. The common reticulation line assembly 150 further comprises control and service lines for connecting the unit 110 to a monitoring station (not shown).

The common reticulation line assembly 150 runs as a catenary to a submerged yet buoyant tethered mooring 152 and descends to run along the sea floor 106 to a destination which is typically a site at which the electricity and potable water is recovered for use or distributed further.

In the arrangement shown, the unit 110 has provision for manoeuvrability and steering in the body of water 102, comprising two thruster modules 160, each adapted to be releasably mounted in opposed relation on the body 116. The thruster modules 160 are typically arranged at opposed ends of the unit along the major axis. FIG. 3B illustrates one thruster module in more detail. The thruster modules 160 are remotely operable and can therefore be deployed and controlled remotely.

Figure 2:
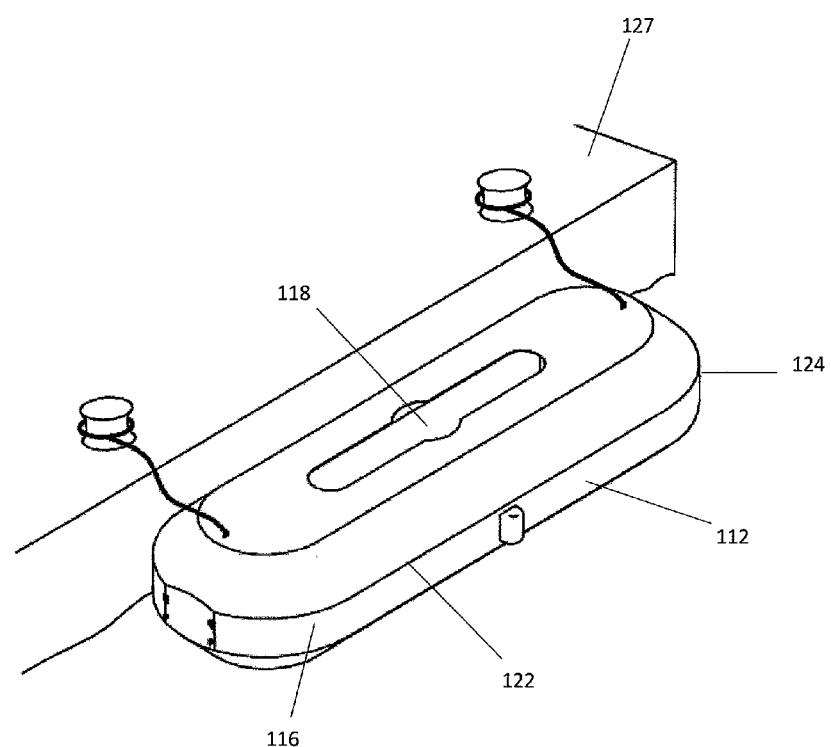
FIG. 2 corresponds to step A and is a schematic view of a unit providing a buoyant structure moored alongside a structure.
Figure 3:
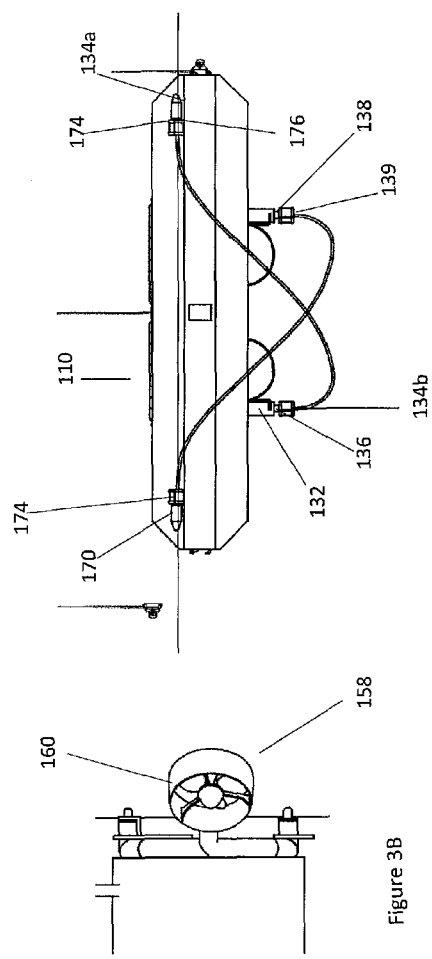
FIG. 3A corresponds to step B and is a schematic side view illustrating installation of the thruster module to complete assembly of the unit.
FIG. 3B is a schematic view, on a larger scale, of a thruster module adapted to be mounted on the assembled unit.

In accordance with a second embodiment of the invention there is described a method of deploying a wave energy conversion system such as is described in the first embodiment of the invention. Referring now to FIG. 2, this embodiment of the deployment system according to the invention involves floating the body 116 in a body of water, positioning of the body 116 at a structure 127 and then mooring the body to the structure 127 so that the body is suitably restrained. At this stage, the unit 110, or more particularly the body 116, is in the first buoyancy state which allows it to float on the water surface 104.

Figure 4:
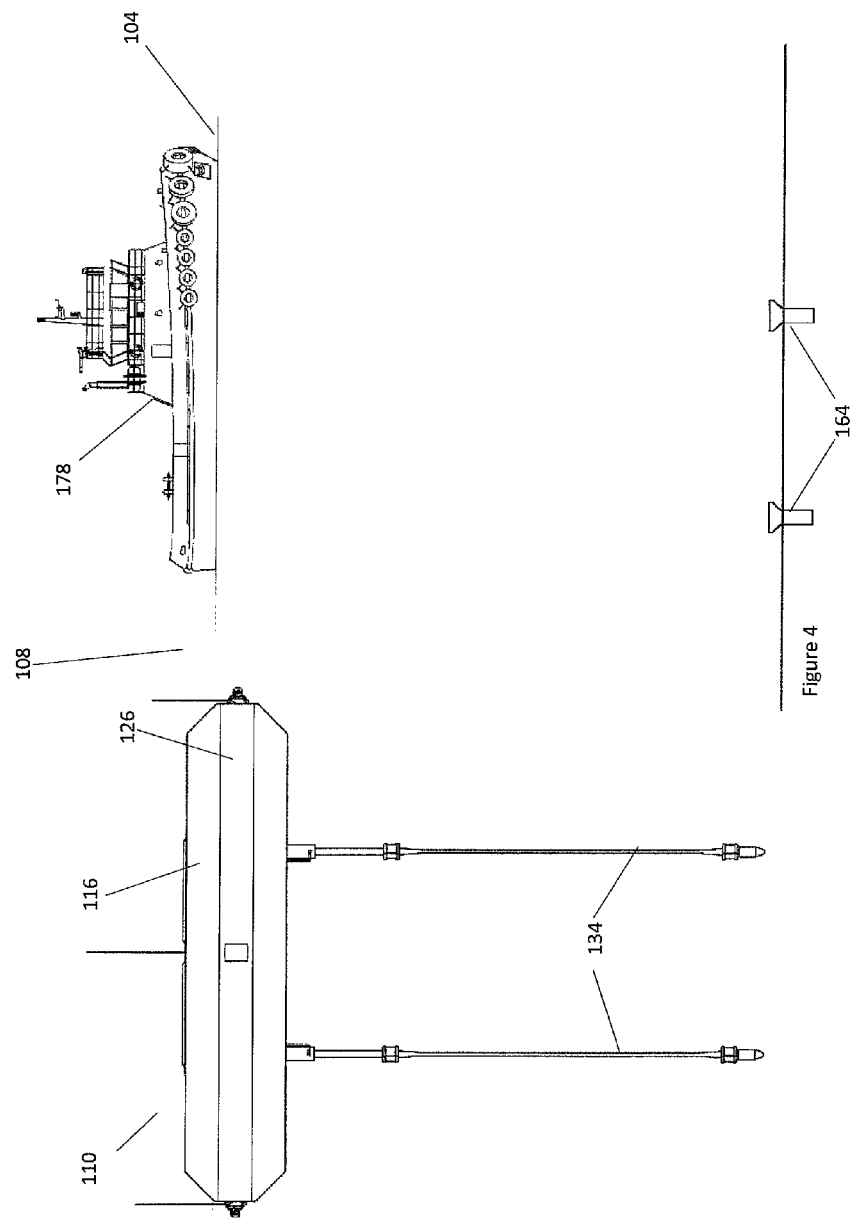
FIG. 4 corresponds to step C and illustrates the unit being towed to an installation site, with tethers having being deployed in preparation for anchoring of the unit to the sea bed.

The flexible nature of the tethers 134 accommodates deflection of the tethers 134 as they move from the position shown in FIG. 11 in which their top ends 134b are at the upper side of the unit 110 to the position shown in FIG. 4 in which are on the underside of the unit. At this stage, the bottom ends 134a of the tethers 134 are held in, and remain in, the stowed configuration in the cradles 176 provided on the exterior of the body 116.

The thruster modules 160 are then installed on the body 116. Alternatively, the thruster modules 160 may be installed on the body 116 at a later stage, such as when the unit 110 is at the installation site 108. In this arrangement the thruster modules 160 are arranged to be adaptively buoyant, in that they are configurable between a first (buoyant) condition and a second (non-buoyant) condition. The thruster modules 160 may be configured for example by taking in or removing water from the body thereof.

The assembled unit 110 can then commence its transit through the body of water 102 along the surface 104 thereof towards the installation site 108. In the arrangement as shown, the assembled unit 110 is towed to the installation site using towing vessel 178, as shown in FIG. 4. Other arrangements as discussed in the sixth embodiment of the invention are also possible.

As the unit 110 approaches the installation site 108, the bottom ends 134a of the tethers 134 are released from the cradles 176, thereby allowing the tethers to fall into a second configuration in which they drape from the unit 110, as shown in FIG. 4.

The towing vessel 178 can then manoeuvre the unit 110 into a general position above the anchors 166 at the installation site 108.

During transportation to the installation site 108, the unit 110 is in the first operating state in which it floats on the water surface 104 and thereby can be moved through the body of water along the surface. When at the installation site 108, the unit 110 is moved into alignment with the anchors 166.

At this stage, the thruster modules 160 are configured to be utilised to manoeuvre the unit 110 into a position in which the respective coupling elements 170, 172 of each coupling assembly 168 are aligned.

In accordance with preferred embodiments of the invention, the thruster modules 160 are remotely operable, with GPS and geomatic support to assist in positioning the unit 110 with respect to the anchors 166 at the installation site 108.

With the coupling elements 170, 172 of each coupling assembly 168 aligned, the tethers 134 are connected to their respective anchors 166 by way of a stab connection process, which involves actuation of the pumps 132 to cause them to undergo an extension stroke, causing the tethers 134 to plunge, thereby plunging the male coupling portions 170 into mating engagement with the respective female coupling portions 172.

The connection provided by the interacting male and female coupling portions 170, 172 is releasable in this embodiment. For this purpose, a removable locking pin (not shown) may be provided to retain the coupling portions 170, 172 in coupling engagement in order to withstand upward loads likely to be imposed on the coupling connections. If the connection is required to be released at some later stage, such as during a unit recovery operation, the coupling pin can be released. The release of the coupling pin may be accomplished in any appropriate way, such as by use of a remotely operable release system linked to the coupling assemblies 168 from the unit 110 or from a control centre for the wave energy conversion system 100, or by manipulation using a subsea remotely operated vehicle.

At this stage, the unit 110 is still floating on the water surface, as shown in FIG. 5.

The unit 110 is then submerged below the water surface 104, at a depth such that its upper surface is a few meters below the neutral water line, as shown in FIG. 6. The step of submerging the unit 110 in the body of water 102 comprises moving the pumps 132 from the extended condition to the contracted condition, thereby pulling the unit into the water. Because the pumps 132 are attached to the tethers 134, which are themselves anchored to the seafloor 106, the contraction of the pumps 132 reduces the effective distance between the buoyant structure 126 and the seabed, and the unit 110 is thereby pulled into the submerged condition.

Once the stab connections have been made and the unit 110 lowered by contracting the pumps 132, it is important to keep the tethers 134 taut with upward buoyant force from the buoyant structure 126.

The thruster modules 160 can then be removed if desired. Alternatively, the thruster modules 160 can be permanently retained in position on the body 116.

Figure 7:
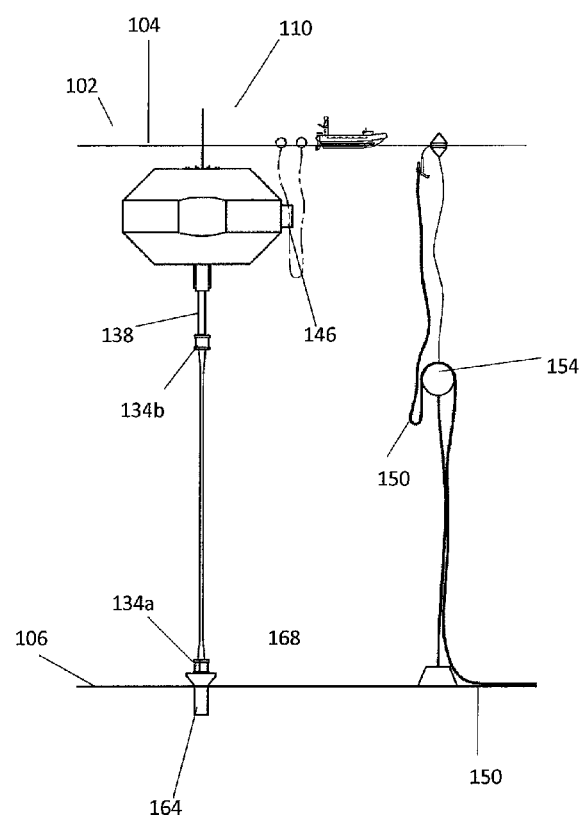
FIG. 7 corresponds to step F and is a schematic view illustrating connection of reticulation lines on the unit to a floating tethered mooring.

In the arrangement shown, the thruster modules 160 are released from the unit 110 and towed away from the installation site 108, as depicted in FIG. 7. In releasing each thruster module 160, the latter is configured to return from the second (non-buoyant) condition to the first (buoyant) condition, thereby allowing the released thruster module to float to the water surface 104 for recovery by vessel 162.

The unit 110 now needs to be installed to the reticulation system 151 to allow electricity and potable water generated to be transferred to the intended delivery site. The common reticulation line assembly 150 is positioned alongside the unit 110 at the installation site 108, with the end 110 thereof supported temporarily on a surface float 111 tethered to the sea bed by way of temporary tether 182. In this way, the end 110 of the common reticulation line assembly 150 is conveniently accessible at the water surface. The end 110 of the common reticulation line assembly 150 is provided with a coupling assembly adapted to be connected to the electrical outlet 146 and the water outlet 148 on the body 116.

Figure 8:
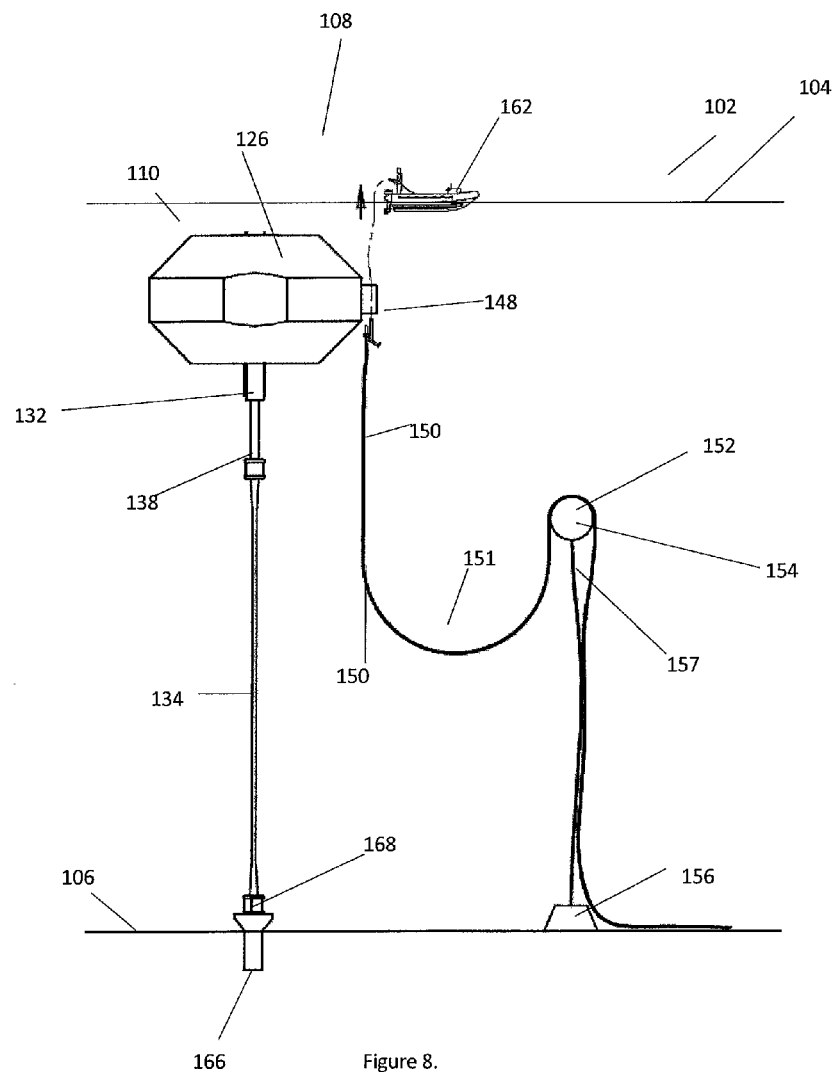
FIG. 8 corresponds to step G and is a view similar to FIG. 7 except that it depicts completion of the connection of the reticulation lines to the unit.

A deployment vessel is used to transfer the end 110 of the reticulation line assembly 150 to the unit 110. In the arrangement shown, the vessel 162 used for towing the thrusters 160 as depicted in FIG. 6 is also used as the deployment vessel, as shown in FIGS. 7 and 8. With the assistance of a diver or a subsea remotely operated vehicle, the end 110 is coupled the electrical outlet 146 and the water outlet 148 on the body 116 of the unit 110 to establish the catenary run, as shown in FIG. 9.

Figure 9:
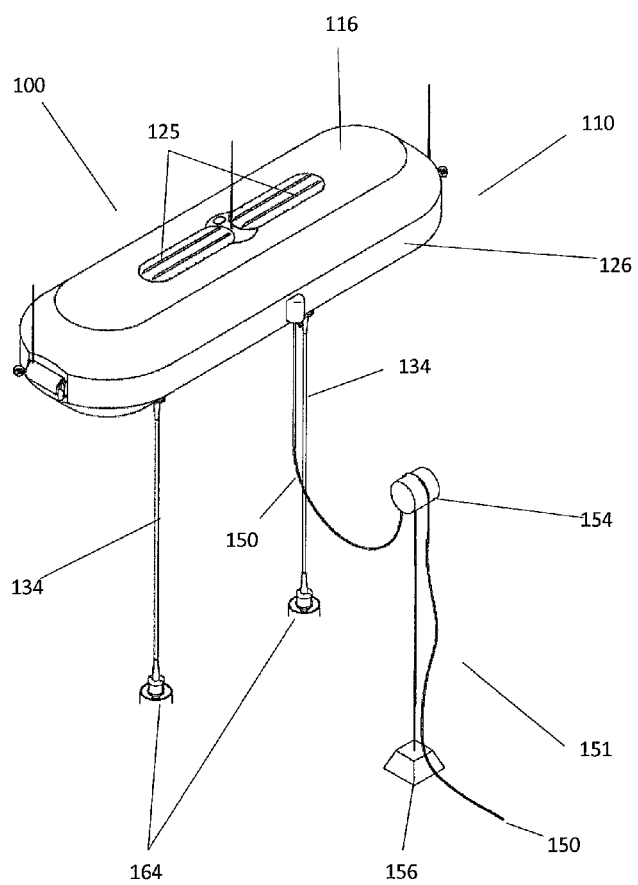
FIG. 9 corresponds to step H and is a perspective view of the final arrangement which provides a wave energy conversion system.

Any other steps required to complete the commissioning process can then be completed and the various installation vessels and personnel can leave the installation site 108, with the result that the wave energy conversion system 100 is installed and ready for operation, as depicted in FIG. 9

The unit 110 can be recovered from the installation site 108 and returned to the structure 127 or delivered to any other site as required. The recovery procedure is broadly a reverse procedure to that described in relation to delivery of the unit 110 to the installation site 108. In the recovery process, however, the buoyant actuator is bought to maximum submergence, with the pumps 132 fully contracted. Once the unit 110 is established in this configuration the coupling assembly 168 is released. The unit 110 then buoyantly rises towards the water surface 104. With this arrangement the unit 110 is able to ascend to the surface 104 whilst limiting load fluctuations on the pumps 132, particularly in that over extension of pumps 132 is avoided.

In this embodiment two vessels are used in the installation and recovery process, one being a larger vessel 178 for towing the unit 110 as depicted in FIG. 4 and the other being a smaller vessel 162 performing several other functions, as depicted in FIGS. 6, 7, and 8. Other arrangements are, of course, possible.

In the first embodiment the unit comprised a body 116 which was afforded pumps 132 operably connected by tethers 134 to fixtures 164 on the sea floor. Other arrangements are possible.

In accordance with a third embodiment of the invention, the unit 110 is of modular construction comprising a first portion 112 and a second portion 114. The first portion 112 comprises a body 116 having a cavity 118 for accommodating the second portion 114. The second portion 114 is configured as a module 120 adapted to be received in the cavity 118 within the body 116.

Additionally, the cavity 118 within the body 116 is open and in readiness to receive the module 120. The module 120 is lifted from the structure 127 using a crane (not shown) having a lifting cable with a lifting fixture 121 at its end, with the lifting fixture being connected to the module 120 by way of lifting ties 123, as shown in FIG. 11.

The module 120 is lifted into a position in which it is aligned above the cavity 118 and then held in that position to facilitate coupling of the tethers 134 to the pumps 132. The tethers 134 are in a stowed configuration with their top ends 134b readily accessible to permit workers to connect the coupling elements 140 provided on the top ends 134b of the tethers 134 to the mating coupling elements 139 on the bottom end of the piston rods 138. As part of this process, the upper sections of the tethers 134 are raised to lift the top ends 134b upwardly into position for engagement with the coupling elements 139 on the pump piston rods 138.

At this stage the module 120 is coupled to the electrical outlet 146 and the water outlet 148. Typically, this is done while the unit 110 is moored to the structure 127 and prior to commencement of towing of the unit to the installation site 108, however, in other arrangements, this process can be completed as part of the installation of reticulation lines or assembly 150.

Once the tethers 134 have been connected to the pumps 132, the module 120 can be lowered into the cavity 118. When the module 120 is accommodated within the cavity 118, the bottom ends of the piston rods 138 extend partly beyond the underside of the body 116, as shown in FIG. 5.

The body 116 is arranged to have an elongate configuration which is advantageous as it allows the body 116 to be moored alongside fixed or floating structure 127, such as a pier 128 as shown in FIG. 2, with the major axis extending along the structure 127 and the minor axis transverse to the structure 127. This arrangement reduces the reach required from the structure 127 for installation of the module 120 into the cavity 118 within the body 116.

Installation and recovery of the module 120 with respect to the body 116 is typically performed using a lifting arrangement and would likely comprise a crane having a boom from which a haul line would extend. Having regard to costs, it is desirable to limit the size of the crane, and an arrangement which limits the necessary boom length is therefore advantageous. This arrangement, which reduces the reach required from the structure 31 for installation of the module 120, is consistent with this approach.

Furthermore, with the modular construction of the unit 110, there is only a requirement for a facility to lift the module 120 rather than the overall unit 110.

As shown, the module 120 incorporates a central housing section 144 in which there can be accommodated a first apparatus (not shown) communicating in a closed circuit with the pumps 132 and operable by the pressurised fluid to generate electricity. The first apparatus typically comprises a hydraulic motor or turbine operable by the pressurised fluid, and an electric generator adapted to be driven by the hydraulic motor or turbine. Further, the central housing section 144 accommodates a second apparatus for the production of potable water. The second apparatus comprises the reverse osmosis desalination system.

In alternate configurations of this embodiment the module 120 incorporates the pump(s) 132 as shown in FIG. 11.

In this arrangement the tethers are arranged in a third configuration where they are configured for attachment to the pump(s) 132 as it is installed within the body. In this configuration, the top end 134b of each tether 134 is accessible from above the cavity 118 to permit a worker to connect the coupling element 140 provided on the top end of the tether 134 to the mating coupling element 140 on the bottom end of the respective piston rod 138 prior to installation of the module 120 in the cavity 118. Further, the body 116 is provided with a support arrangement 174 for receiving and holding the bottom end of each tether 134 in position on the body. In the arrangement shown, the support arrangement 174 comprises a cradle 176 adapted to receive the male coupling portion 170 fitted to the bottom end 134a of the tether 134.

If repair or maintenance is required to components onboard the module 120, the latter can be removed from the body 25 through the upper end of the cavity 118 in a procedure which is substantially a reverse of the procedure described and illustrated in FIG. 2.

In the first and second embodiments of the invention there is provided a buoyant structure 126 comprising a body 116. The buoyant structure 126 has a fixed buoyancy. Other arrangements are possible.

In accordance with a fourth embodiment of the invention there is described a wave energy conversion system 100, wherein the buoyant structure 126 further comprises means for controlling the buoyancy of the buoyant structure 126, whereby different sections of the buoyant structure may be caused to descend in the water at different times. In this embodiment, the buoyant structure 126 incorporates chambers (not shown) which can be selectively flooded or evacuated to tilt one or both ends of the buoyant structure, as shown in FIG. 12.

Alternatively, the chambers may be selectively flooded or evacuated to aid in positioning the unit 110 at the installation site 108. Such an arrangement is particularly beneficial as it allows the unit 110 to be lowered in the body of water 102 prior to engagement of the tethers 132 with the fixture 164.

In the first embodiment, the buoyant structure is arranged in a first buoyant condition, whilst the stabbing action of the pumps 132 is performed. Other arrangements are possible Once coupling engagement between one tether 134 and the respective anchor 166 has been established there is the added benefit of the partial stabilisation of the whole unit 110 at least against pitch, roll and surge, which will assist with the attachment of the other tether to the respective anchor. Once the second tether 134 is ready to be lowered, the same process may be repeated at the other end using buoyancy control to bring that end down and return the structure to a horizontal attitude at the lower freeboard, as shown in FIG. 13. Stabbing to effect the second coupling engagement between the second tether 134 and the respective anchor 166 is then effected, thereby establishing the second coupling 90b.

In the first embodiment of the invention there is provided a wave energy conversion system 100, having two pumps 132 and two tethers 134. Other arrangements are possible, such as a single or a plurality of pumps arranged to engage a single or a plurality of tethers.

In accordance with a fifth embodiment of the invention there is provided a wave energy conversion system 100, comprising four pumps 132 arranged to engage two tethers 134. Each respective pair of pumps 132, engage the tether 134 through intermediate tethers 212.

It should be appreciated that any number of tethers 134 optionally connected by any number of intermediate tethers 212 may be deployed in accordance with the invention.

In the first embodiment of the invention, there is described a wave energy conversion system 100 which is afforded a provision for maneuverability and steering in the body of water 102, comprising two thruster modules 160, each adapted to be releasably mounted in opposed relation on the body 116. Other arrangements are possible.

In accordance with a sixth embodiment of the invention, there is provided a wave energy conversion system 100, comprising a thruster propulsion system 198 integrally formed within the body 116. The thruster propulsion system 198 provided the ability to manoeuvre and steer the unit 110 in the body of water 102.

In the first and fifth embodiments of the invention, there is described a wave energy conversion system 100 which is afforded a provision for maneuverability and steering in the body of water 102, comprising either thruster modules 160 or an integrated propulsion system 198. Other arrangements are possible.

In accordance with a seventh embodiment of the invention there is provided a wave energy conversion system 100, which is afforded a propulsion system 158 for moving the unit 110 to the installation site 108. The propulsion system 158 comprises an integral propulsion system 198 incorporated in the body 116 or a plurality of thrusters 160 attached to the body.

Regardless of whether the arrangement comprises the integral propulsion system 198 or thruster modules 160, the propulsion system 158 comprises a drive system 135 operable to drive the thrusters 160 or 200. The drive system 135 incorporates a power pack 204 which is removable from the body 116 after installation of the unit 110 at the installation site 108. The power pack 204 is buoyant.

Figure 15:
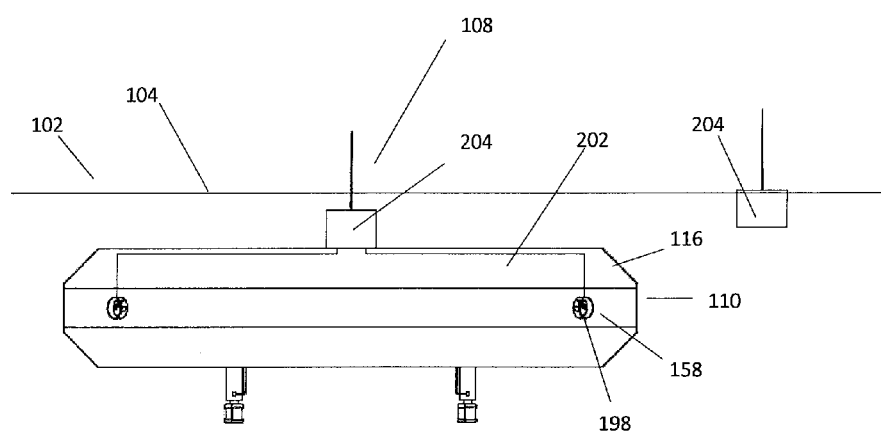
FIG. 15 is a schematic side view of a wave energy conversion system being deployed using a sixth, seventh or eighth embodiment of a deployment system according to the invention.
Figure 16:
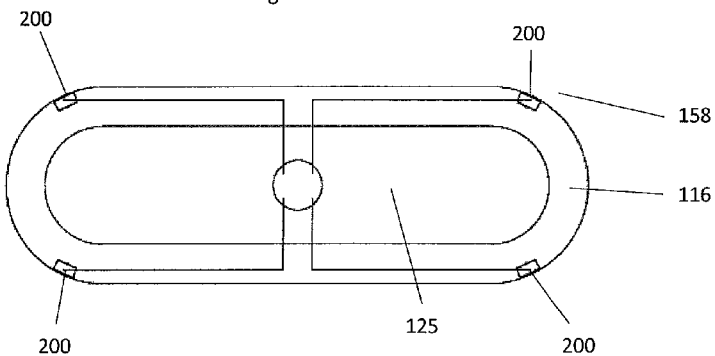
FIG. 16 is a plan view of the arrangement shown in FIG. 15.

The power pack 204 is shown in FIG. 15 still aboard the unit 110. For illustrative purposes, the power pack 204 is also shown separately in FIG. 15 in a condition removed from the unit 110 and floating on the water surface 104.

In accordance with the eighth embodiment of the invention, the unit 110 may be arranged to float on the surface 104 of the body of water 102 or through the action of the buoyancy control means afforded the buoyant structure 126 may be submerged in the body of water 102. In the arrangements as presently described the propulsion system may be adapted to allow the unit 110 to be moved when floating on the surface 104, such as a boat. Alternatively, the unit 110 may be configured to be submerged in the body of water 102 whilst moving to the installation site 108. Advantageously such arrangements allow for the unit 110 to move to site largely unaffected by local weather conditions.

Figure 17:
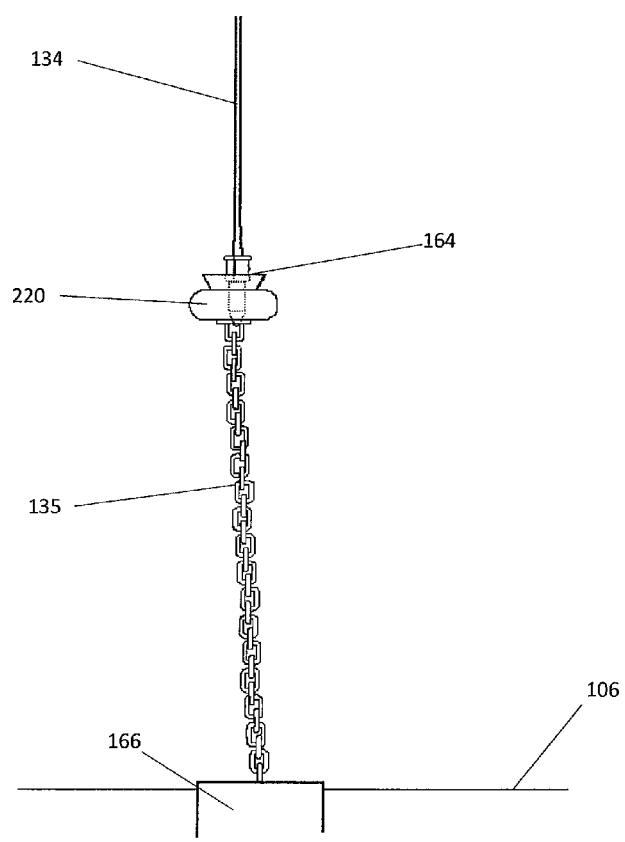
FIG. 17 is a schematic side view of a wave energy conversion system being deployed using a ninth or tenth embodiment of a deployment system according to the invention.

In accordance with a ninth embodiment of the invention as shown in FIG. 17, the tethers 134 are adapted to engage a fixture 164 which is buoyant. The buoyant fixture 164 being operably connected with an anchor 166 installed in the sea floor 106. The anchor 166 may be of any appropriate form well understood by a person skilled in the art. The anchors 166 are installed in the sea floor 106 at appropriate locations prior to delivery of the unit 110 to the installation site 108.

The fixture 164 is operably connected to the anchor 166 by means of an additional tether 135. The additional tether

135 may be of a similar construction to the tether 134 or may comprise a composite construction comprising a plurality of rigid sections and a plurality of flexible sections disposed alternately along the length of the tether.

In the first embodiment of the invention, the tethers 134 are located via the thruster modules 160 positioning the unit 110 such that upon actuation of the pumps 132, the coupling portion 170, 172 are bought into engagement. Other arrangements are possible.

Figure 30:
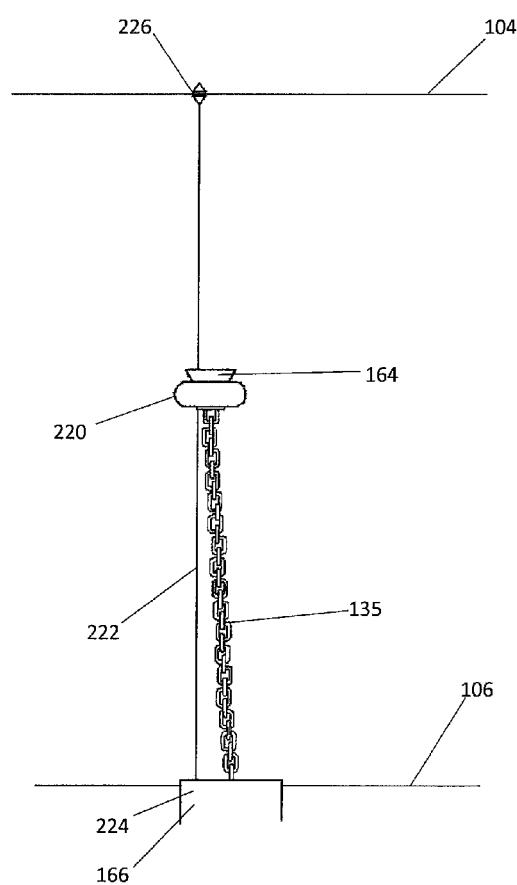
FIG. 30 is a schematic view of a wave energy conversion system being deployed using a tenth embodiment of a deployment system according to the invention.

In accordance with a tenth embodiment of the deployment system in accordance with the invention, there is provided a guide line 222 associated with the fixture 164 as shown in FIG. 30. The guide line 222 is provided at a distal end thereof a buoy 226, such that the distal end of the guide line 222 is arranged at the surface 104 of the body of water.

Figure 31:
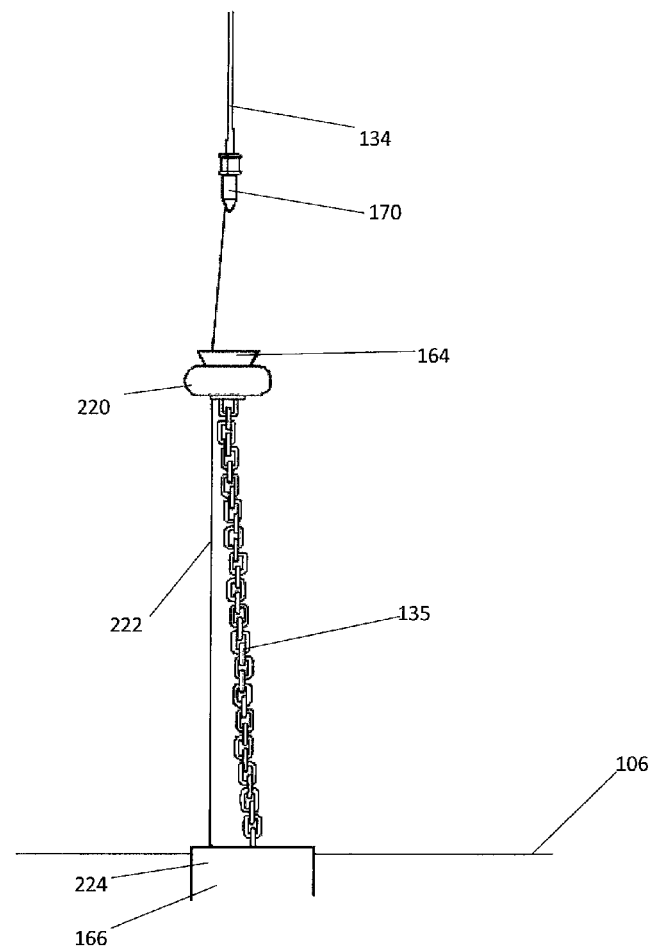
FIG. 31 is a schematic view of the deployment system of FIG. 30 as a coupling portion nears a buoyant fixture.

Once the unit 110 arrives at the installation site 108, the guide line 222 is recovered, the coupling portion 170 associated with the end of the tether 134*a* is connected to the guide line 222. In the arrangement as shown in FIG. 31, the guide line 222 is arranged to engage a winching mechanism 224 located within the anchor 166. Once the guide line 222 and the coupling portion 170 are bought into engagement the winching mechanism 224 is caused to be actuated, thereby retracting the guide line 222 and urging the end of the tether 134*a* towards the fixture 164 and bringing the coupling portion 170 together with coupling portion 172. Once the coupling portions 170 and 172 are proximate to each other, the pumps 132 are actuated to being the coupling portions 170, 172 into engagement forming coupling assembly 168.

Figure 32:
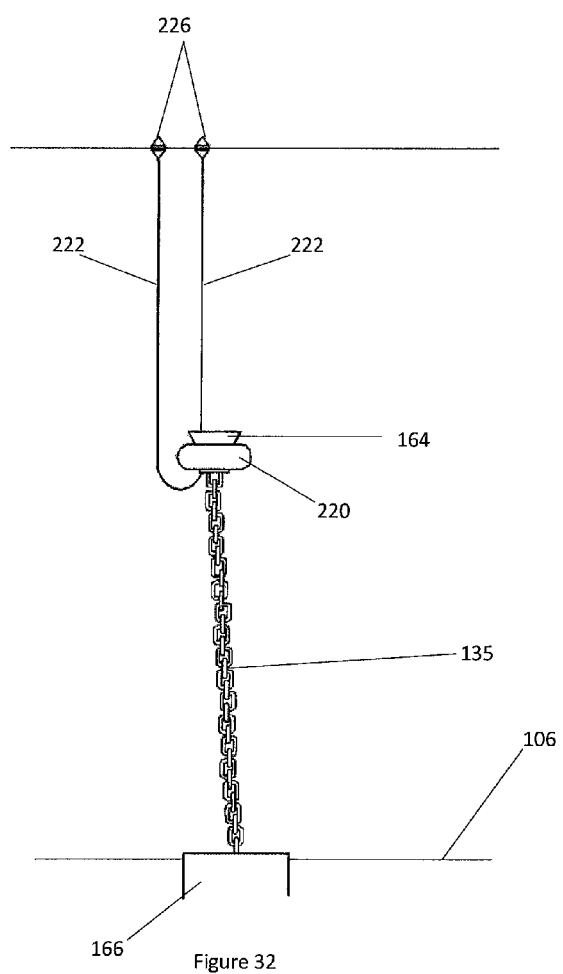
FIG. 32 is a schematic view of a wave energy conversion system being deployed by an alternative arrangement of the tenth embodiment of a deployment system according to the invention.

In an alternative arrangement as shown in FIG. 32, the guide line 222 is configured to have a buoy 226 located at either end thereof, with the guide line 222 passing through the fixture 164. In this arrangement, once the unit 110 arrives at the installation site 108, one end of the guide line 222 is recovered and bought into engagement with the coupling portion 170 at the end of the tether 134*a*.

Once the guide line 222 and the coupling portion 170 are bought into engagement, the opposing end of the guide line 222 is then recovered. The guide line 222 is drawn in, therein causing the guide line 222 to be drawn through the fixture 164 and drawing the coupling portion 170 into proximity with coupling portion 172. Once the coupling portions 170 and 172 are proximate to each other, the pumps 132 are actuated to being the coupling portions 170, 172 into engagement forming coupling assembly 168.

In the first embodiment of the invention, there is described a wave energy conversion system 100 comprising two tethers 134 which are unconstrained when in the second configuration. Other arrangements are possible, particularly as there may be a tendency for the tethers 134 to move laterally in the body of water 102 prior to the stabbing process, causing lateral movement of the male coupling portions 170 relative to their counterpart female coupling portions 172. The lateral movement can occur through a range of factors, including: (a) surface movement due to seas, swells, currents or tides; (b) dynamic positioning errors created by the propulsion system 158 on the buoyant structure 126; and (c) undersea currents. The lateral movement may be exacerbated by exciting mechanical resonances in the tether modes, the most likely being simple horizontal swaying pendulum resonances but there may be axial resonances as each tether 134 stretches and contracts under the driving of the heave of the buoyant structure 126.

In a eleventh embodiment of the invention of a wave energy conversion system 100, there is provided a means for addressing the issue of lateral movement of the tethers 134 prior to the stabbing process.

Figure 18:
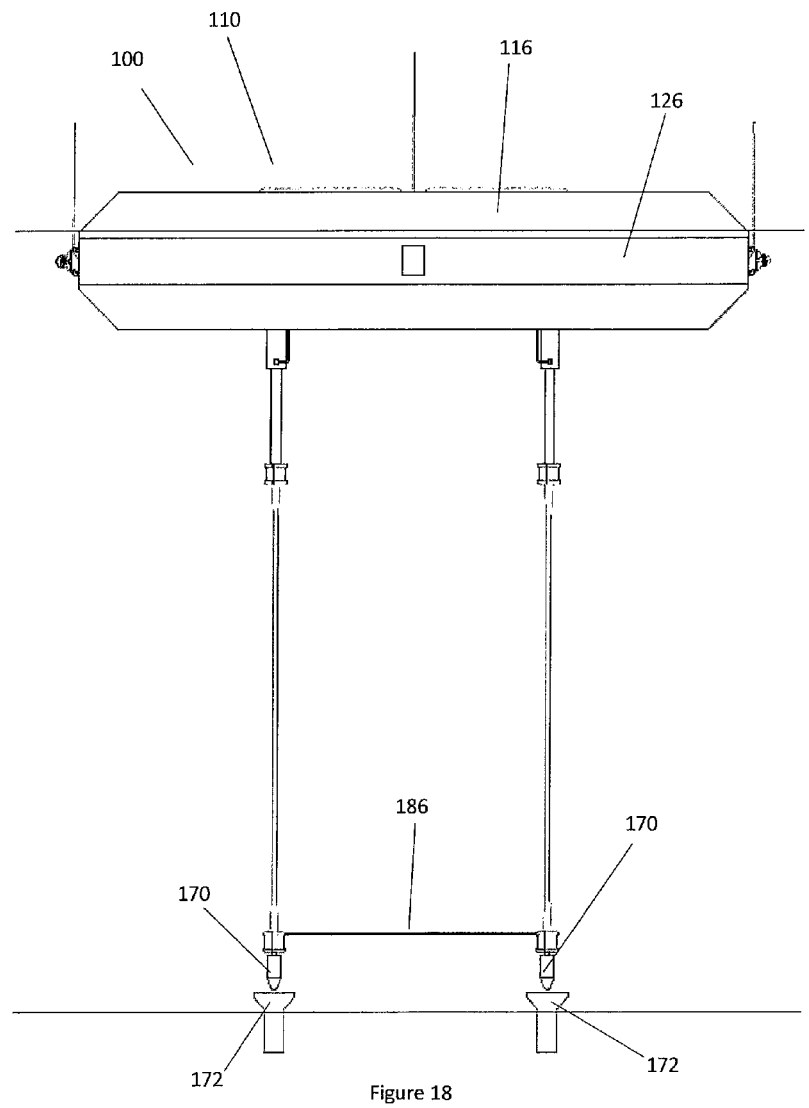
FIG. 18 is a schematic side view of wave energy conversion system being deployed using a eleventh embodiment of a deployment system according to the invention.

In this alternate embodiment as shown in FIG. 18, the deployment comprises establishing a connection 184 between the male coupling portions 170 on the two tethers 134 to limit horizontal motions relative to their counterpart female coupling portions 172. In the arrangement shown, the connection 184 comprises a rigid connection in the form of a bracing strut 186 positioned to extend between the two male coupling portions 170.

The bracing strut 186 is installed at the time that the tethers 134 are unfurled and would be removed after stabbing process. In other arrangements, the bracing strut may be permanently affixed between the two tethers.

Figure 10:
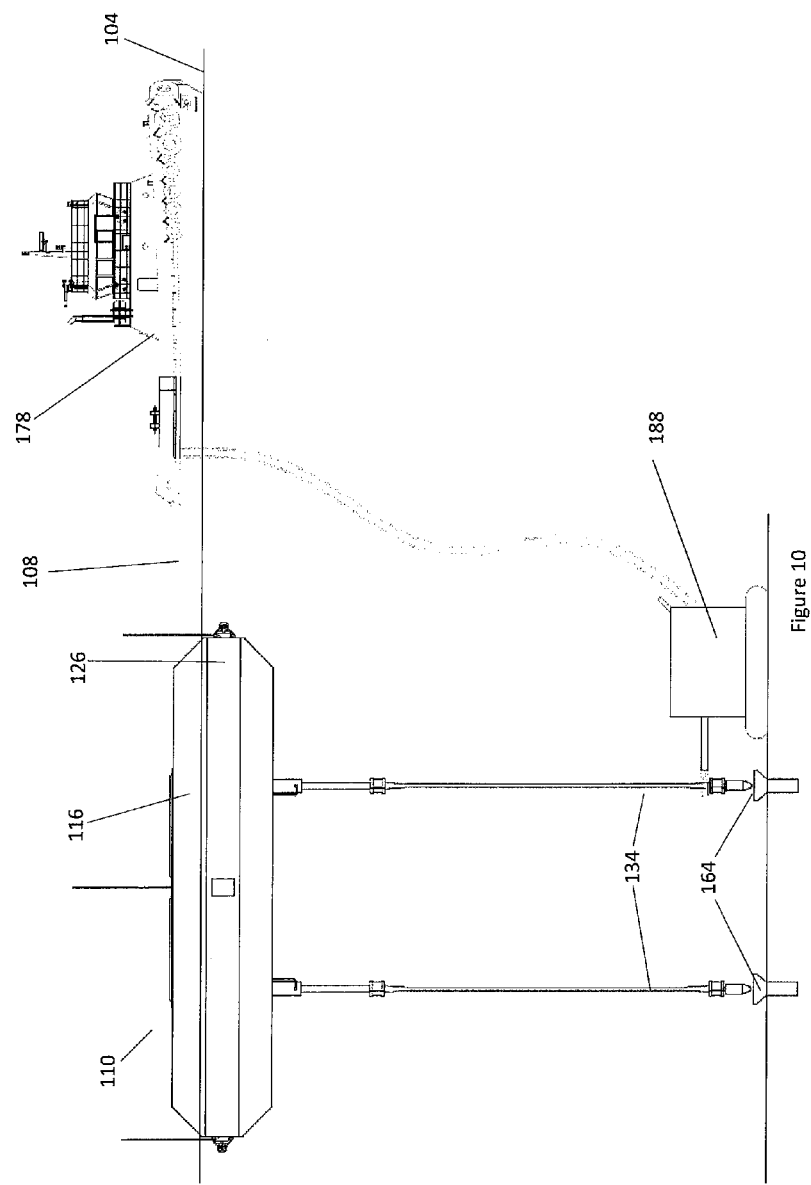
FIG. 10 is a further view of the arrangement shown in FIG. 5, with a remotely operable vehicle being used to complete the stabbing process to connect the tethers to the sea floor.

The bracing strut 186 would limit torsional rotations about a vertical axis as well as maintain a constant separation between the two male coupling portions 170 appropriate for stabbing. In the arrangement shown, a ROV 188 is used to facilitate the stabbing process, as depicted in FIG. 10. The ROV 188 may also be used to facilitate removal of the bracing strut 186.

Other arrangements to control the lateral movement of the tether 134 are also possible.

Figure 19:
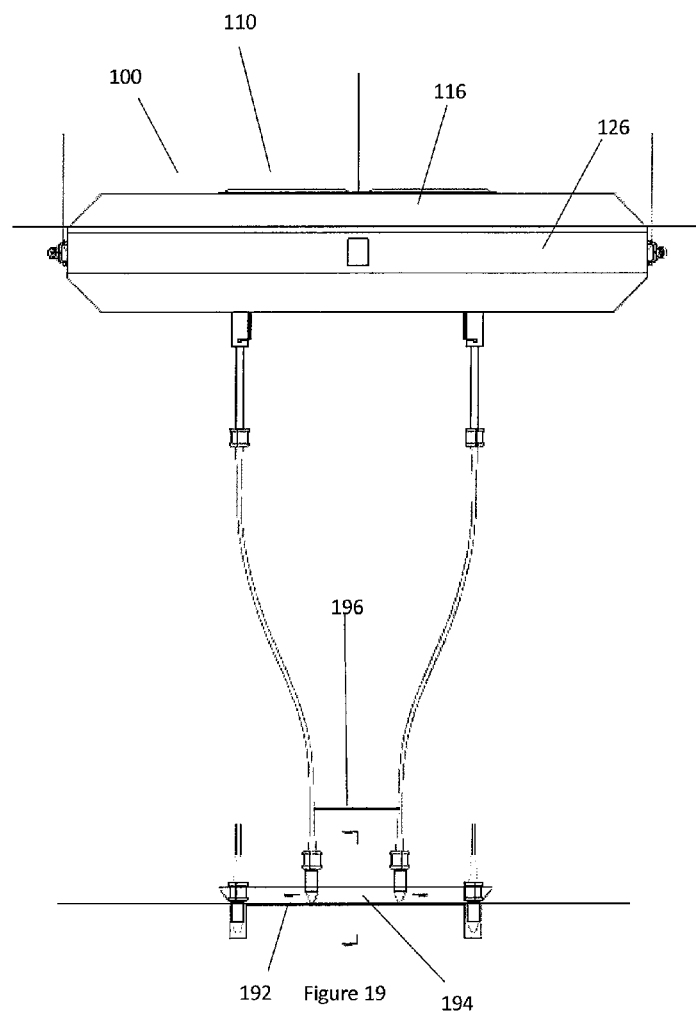
FIG. 19 is a schematic side view of a wave energy conversion system being deployed using an twelfth embodiment of a deployment system according to the invention.

The twelfth embodiment relates to deployment of a wave energy conversion system 100 which is illustrated in FIG. 19.

In this twelfth embodiment, the deployment comprises establishing a bridge 192 between the two female coupling portions 172 which constitute the stab receptacles on the seafloor 106. The bridge 192 incorporates a track 194 extending between the stab receptacles 173. In this embodiment, the track 194 is configured as a slotted keyway. The male coupling portions 170 are adapted for sliding engagement with the track 194 for guided movement there along, as will be explained shortly.

This twelfth embodiment also uses a spreader strut 196 which is somewhat similar to the bracing strut 186 used in the second embodiment. However, the spreader strut 196 is shorter so that the tethers 134 are drawn together slightly, as shown in FIG. 19 to facilitate engagement of the corresponding male coupling portions 170 with the track 194. Once the male coupling portions 170 are in engagement with the track 194, the spreader strut 196 are removed (such as by a ROV). Once the spreader strut 196 has been removed, the tethers 134 extend to their true hanging position and the male coupling portions 170 are dragged along the track 194 to be located over their counterpart female coupling portions 172 in readiness for the stabbing process.

With this arrangement, the ROV may be used to stabilise the motion of each tether 134, locate the respective male coupling portion 170 in registration above the counterpart female coupling portion 172, and even provide (or at least assist with) the necessary thrust to effect insertion of the coupling portion 170 in the counterpart female coupling portion 172 to complete the stabbing process.

The first embodiment of the invention describes having a wave energy conversion system 100 comprising tethers 134 terminating in a coupling portion 170. Other arrangements are possible.

Figure 20:
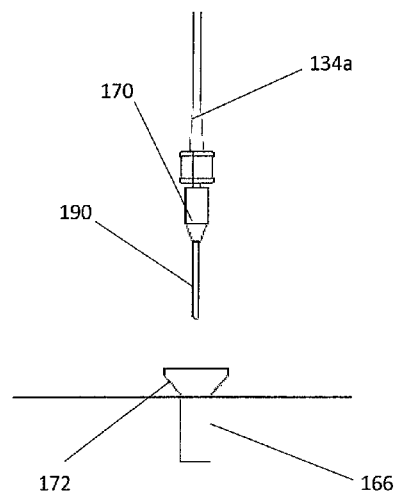
FIG. 20 is a fragmentary schematic view of a portion of a wave energy conversion system being deployed using a thirteenth embodiment of a deployment system according to the invention.
Figure 21:
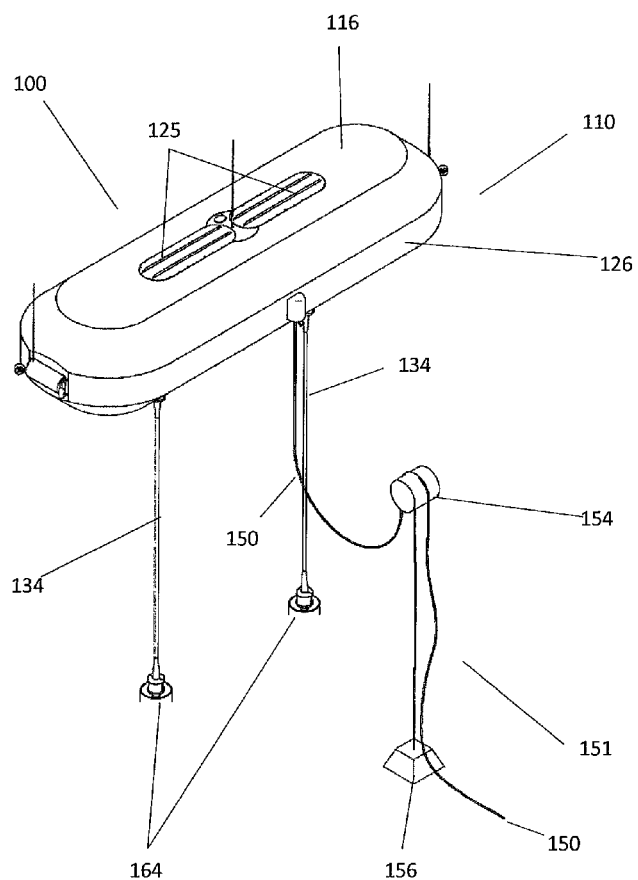
FIG. 21 is a schematic view of a wave energy conversion system being deployed using a fourteenth embodiment of a deployment system according to the invention, wherein the reticulation assembly is arranged to engage a floating tethered mooring.
Figure 22:
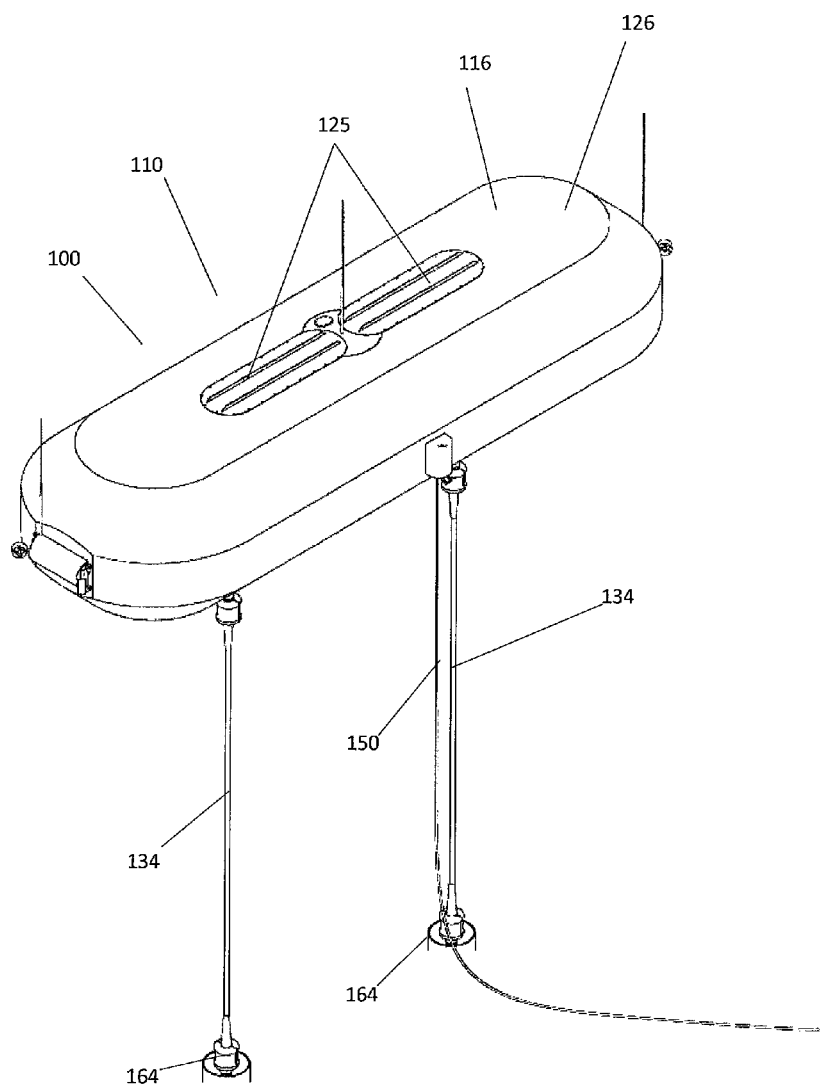
FIG. 22 is a schematic view of a wave energy conversion system being deployed in an alternative arrangement of the fourteenth embodiment, wherein the reticulation assembly is arranged in a catenary to the sea floor.

In a thirteenth embodiment of the invention, which is shown in FIG. 20, each male coupling portion 170 is provided with an extension 190 which is rigid yet laterally flexible. The extension 190 comprises an elastomeric extension piece. The extension 190 is sized to be receivable within the female coupling portion 172, as will be explained. In particular, the diameter of the extension 190 is less than the diameter of the receptacle passage within the female coupling portion 172 so that it can enter the passage without impeding the stabbing process.

The purpose of the extension 190 as shown in FIG. 20 is to provide a flexible locating pin (or key) to afford protection for the stab as it is lowered. As the male coupling portion 170 is lowered, the extension 190 will contact the flared entrance 172a of the female coupling portion 172 and, being elastic, will not be damaged if lateral or vertical movement causes it to contact the flared entrance; it will simply yield. As the tether 134 is further lowered, the extension 190, if keyed into the female coupling portion 172, will restrain horizontal motion making it easier to make the final stab. The extension 190 remains attached after connection is completed.

In the first embodiment, the common reticulation line assembly 150 is arranged to run as a catenary to tethered mooring 152 and then descend to run along the sea floor 106 to its destination. Other arrangements are possible.

Several such other arrangements are featured in deployment of a wave energy conversion system 100 illustrated in FIGS. 21, 22, 23, 24 and 25.

In this fourteenth embodiment, the common reticulation line assembly 150 is positioned to run along one of the tethers 134 to an anchor point 206 on the sea floor 106 and then onwards to its destination. In this way, the need for the tethered mooring 152 is eliminated. The section 60a of the common reticulation line assembly 150 is looped in catenary fashion and incorporates surplus material to accommodate the rise and fall motion of the buoyant structure 126 with respect to the tether 134.

Figure 24:
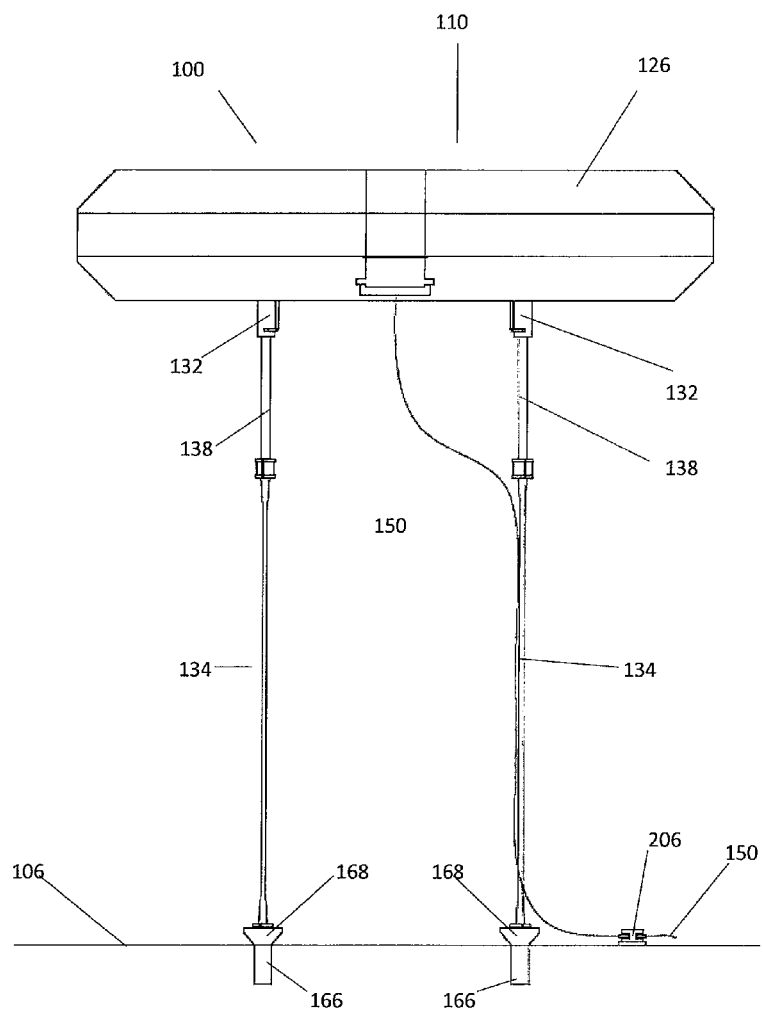
FIG. 24 is a schematic view of a wave energy conversion system being deployed in an alternative arrangement of the fourteenth embodiment, wherein the reticulation assembly runs in a catenary to the tether and then alongside the tether to the sea floor.
Figure 25:
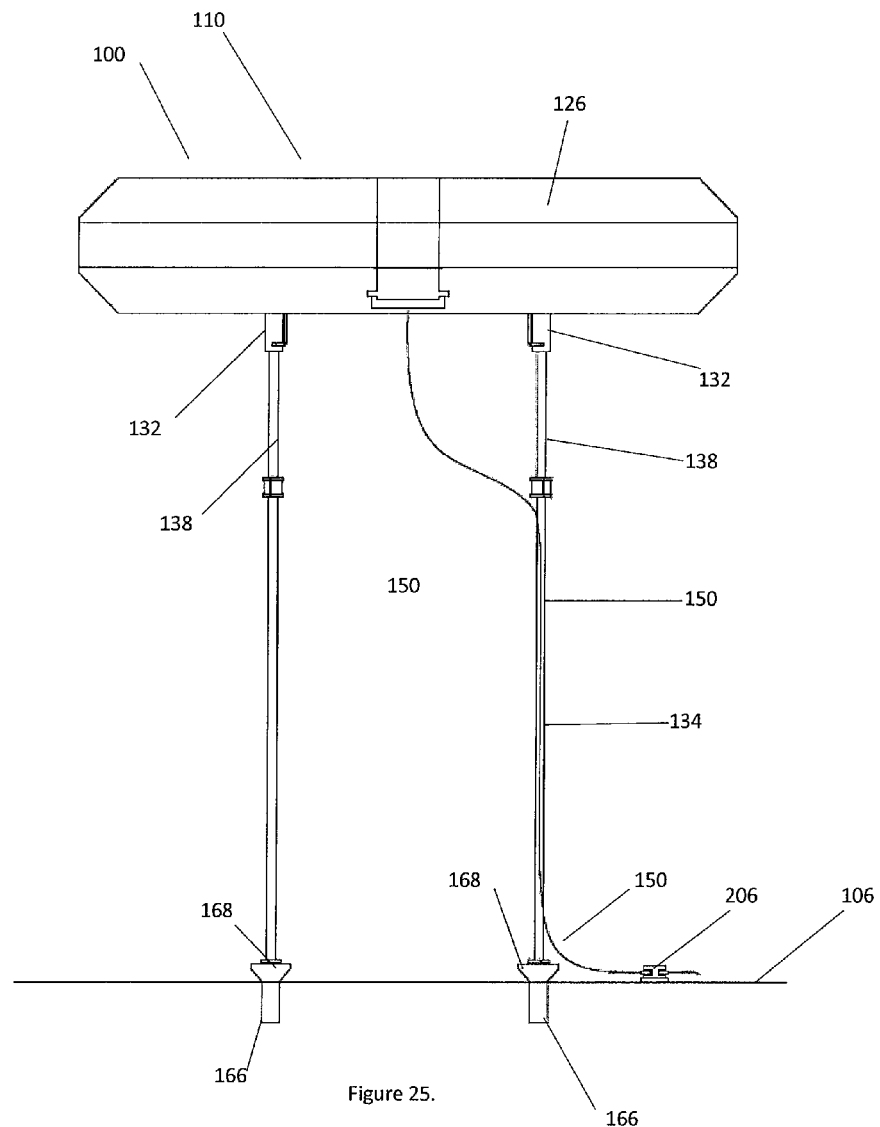
FIG. 25 is a schematic view of a wave energy conversion system being deployed in an alternative arrangement of the fourteenth embodiment, wherein the reticulation assembly runs in a catenary to the tether and then inside the tether through an aperture provided therein to the sea floor.

In one arrangement, which is shown in FIG. 24, the common reticulation line assembly 150 is positioned to run alongside one of the tethers 134 and is typically secured to the tether at intervals along its length. In another arrangement, which is shown in FIG. 25, the common reticulation line assembly 150 is positioned to run internally within one of the tethers 134. Typically, the tether 134 is hollow in order to accommodate the common reticulation line assembly 150.

In another arrangement, the common reticulation line assembly 150 is arranged to descend from the outlets 146 and 148 in a catenary curve to the sea floor 106.

Figure 23:
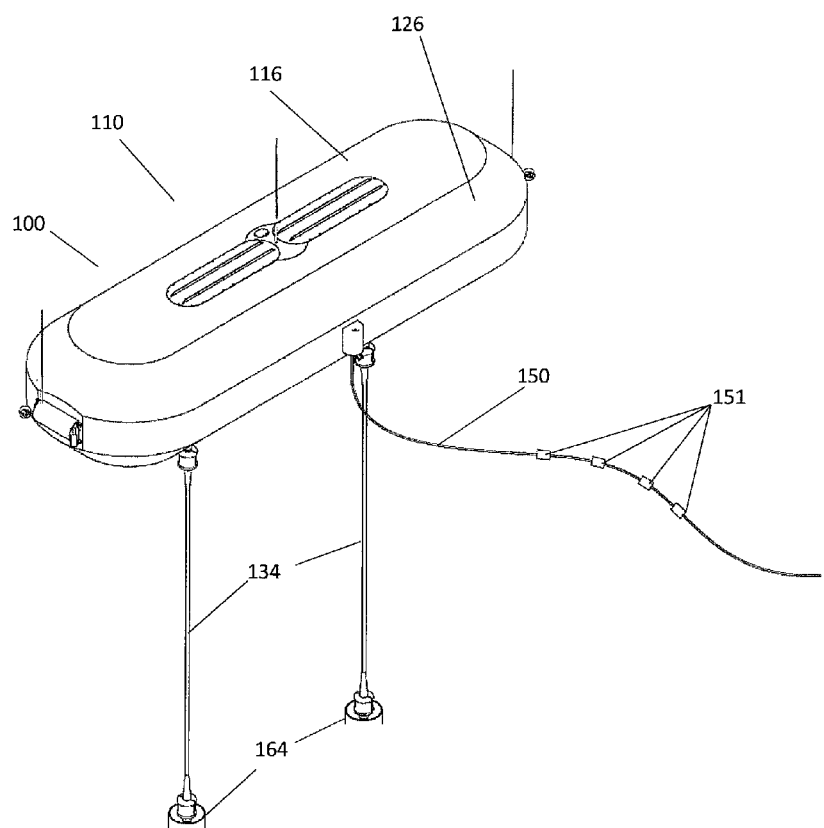
FIG. 23 is a schematic view of a wave energy conversion system being deployed in an alternative arrangement of the fourteenth embodiment, wherein the reticulation assembly runs in a wave arrangement, having distributed along its length a plurality of buoyancy modules to create a wave like shape as it descends to the sea floor.

In yet another arrangement as shown in FIG. 23 the common reticulation line assembly 150 is arranged to have a plurality of buoyancy modules arranged along its length, such that it descends to the sea floor 106 in a wave like arrangement.

In the first embodiment, the tethers 134 are folded into a compact arrangement onto the body 116 when in the first configuration. For this purpose, the body 116 is provided with support arrangement 174 for receiving and holding the bottom end of each tether 134 in position on the body 116. The support arrangement 174 comprises cradle 176 adapted to receive the male coupling portion 170 fitted to the bottom end 134a of the tether 134. Other arrangements are possible.

Figure 26:
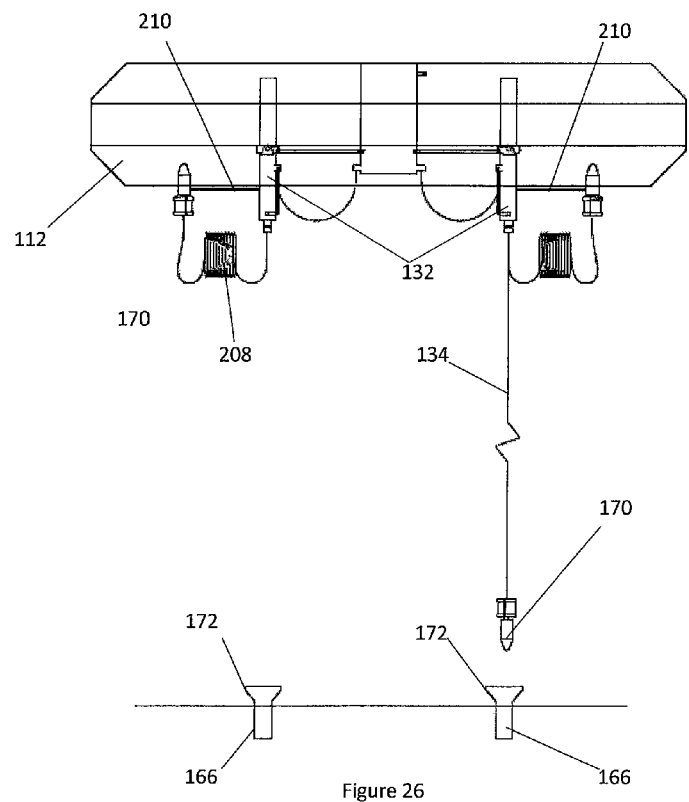
FIG. 26 is a schematic side view of a wave energy conversion system being deployed using a fifteenth embodiment of a deployment system according to the invention.
Figure 27:
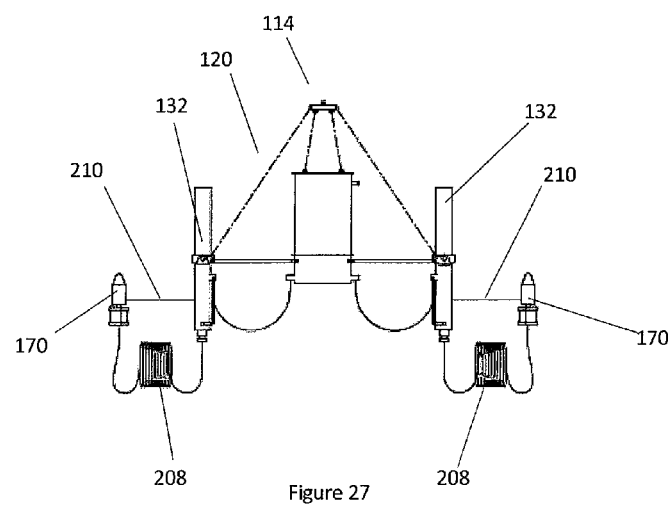
FIG. 27 is a schematic view of a wave energy conversion system being deployed using a sixteenth embodiment of a deployment system according to the invention.

One such other arrangement is featured in a fifteenth embodiment relating to deployment of the wave energy conversion system 100 illustrated in FIGS. 26 and 27.

In this arrangement, the tethers 134 are stored in roll form when in the first configuration. The tethers 134 may each be stored in roll form by being wound into a coil arrangement 145 as depicted in the drawings. The coiled tethers 145 are unfurled from the coiled configuration to move from the first configuration to the second configuration. In the arrangement illustrated, each tether is retained in its coiled arrangement using a retaining mechanism 210 for releasable securing the respective male coupling portion 170. With this arrangement, the coiled tether 145 is caused to unfurl from the coiled configuration upon actuation of the retaining mechanism 210 to release the respective male coupling portion 170, thereby allowing the coiled tether 145 to unfurl under the weight of the male coupling portion 170 and its own weight. For the purpose of illustration, one tether 134 is also depicted in an unfurled configuration in FIG. 26.

In the arrangement shown, the coiled tethers 145 and the associated retaining mechanisms 147 are accommodated entirely on the module 120 which is adapted to be received within the body 116.

The first embodiment of the wave energy conversion system 100 has two pumps 132 arranged vertically within the buoyant structure 126. Other arrangements are possible.

Figure 14:
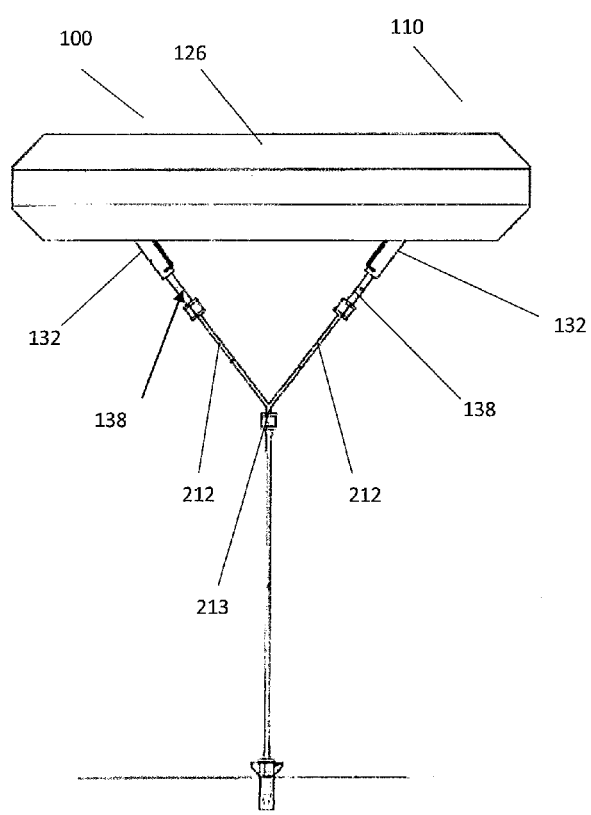
FIG. 14 is a schematic side view of a wave energy conversion system being deployed using a fifth embodiment of a deployment system according to the invention.

One such other arrangement is featured in the sixteenth embodiment relating to deployment of the wave energy conversion system 100 illustrated in FIG. 14, where there is shown a single end of the buoyant structure 126 afforded two pumps 132, with a single tether being common to the two pumps. The single tether 134 is connected to the two pumps 132 via intermediate tethers 212. The two pumps 132 are disposed angularly such that their longitudinal axes (representing their lines of action in moving between extended and contracted conditions) are inclined to the vertical and directed towards the common tether 134.

The mounting arrangement comprises a gimbal assembly (not shown) allowing the pump to move angularly as required. With this arrangement, the two pumps can swing towards and away from each other. Each pump 132 is supported within the unit 110 in a manner which permits angular movement of the pump 132 with respect to the unit 110 to accommodate pitching and rolling motion of the buoyant structure 126 in response to wave motion.

The two intermediate tethers 212 are disposed angularly with respect to each other, as shown in FIG. 14, and function as a bridle coupling the two pumps 132 to the tether 134. With this arrangement, the force acting on the two pumps 132 through the two intermediate tethers 212 and the subsequent extension and contraction of the pump piston causes the pumps 132 to swing arcuately at their lower ends as the buoyant structure 126 responds to wave motion. The arcuate movement of the lower end of the pump corresponds to a progressive reduction in the angle between the two intermediate tethers 212 as the buoyant structure 126 rises and the pump pistons are extended. The arcuate movement of the pumps 132 progressively increases the loading on the pumps as the buoyant structure 126 rises, thereby increasing the force exerted on the pump, which translates to an increase in piston force with stroke.

This feature is applicable to any embodiment having a plurality of pumps coupled to a common tether.

Figure 28A:
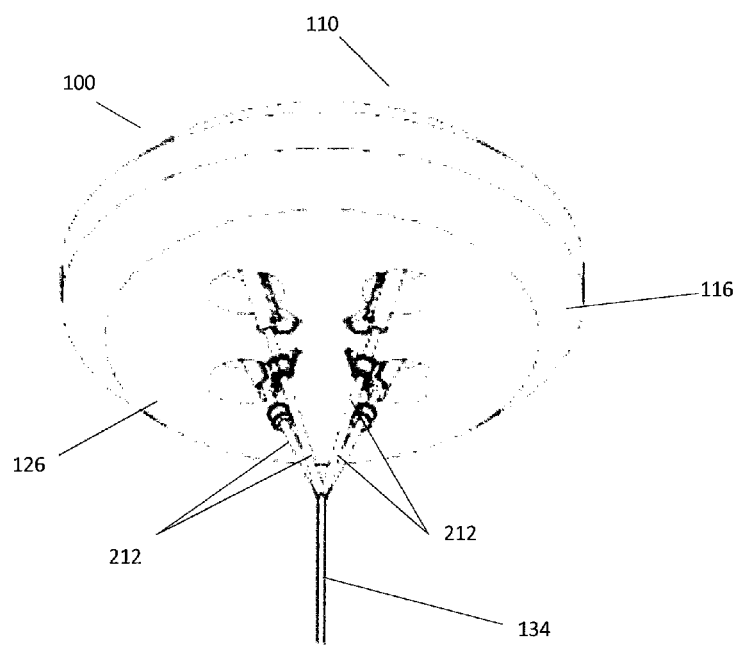
FIG. 28a is a schematic view of a wave energy conversion system being deployed using a seventeenth embodiment of a deployment system according to the invention.

In the sixteenth embodiment of the wave energy conversion system 100, the body 116 is of an elongate configuration in plan. Other configurations are possible. One such other configuration is featured in the seventeenth embodiment relating to deployment of the wave energy conversion system 100 illustrated in FIGS. 28a, 28b and 29.

Figure 28B:
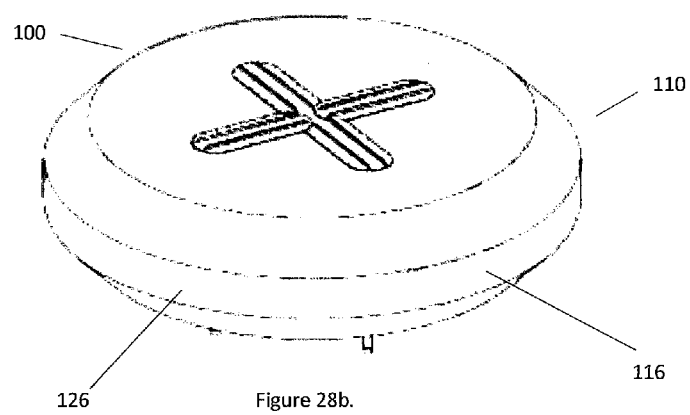

In the seventeenth embodiment, the body 116 is substantially circular in plan. In the arrangement shown there are four pumps 132 which are disposed angularly such that their longitudinal axes (representing their lines of action in moving between extended and contracted conditions) are inclined to the vertical and directed towards the common tether 134. Because the body 116 is substantially circular in plan, the pumps 132 are circumferentially spaced with respect to each other at equal angular intervals. The cavity within the body 116 is of an X-configuration, as depicted in FIG. 28b, to accommodate a module (not shown) configured to support the pumps 132 in their spatial arrangement.

Figure 29:
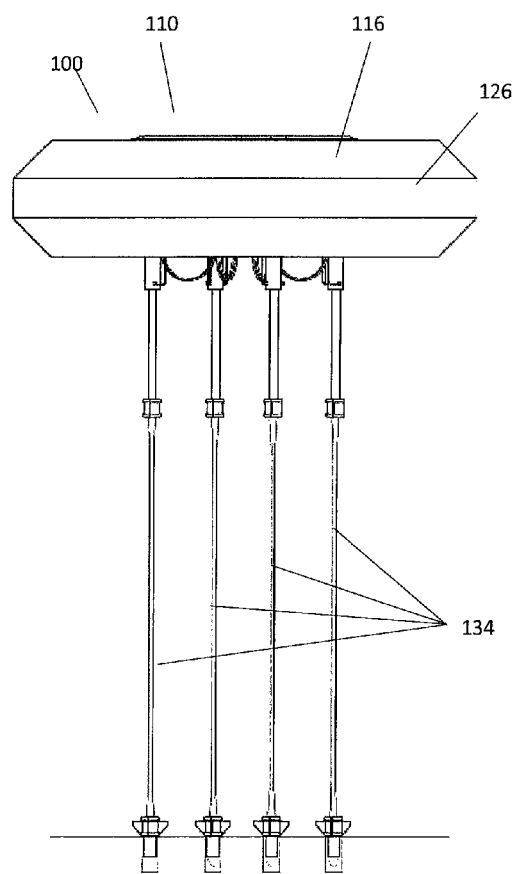
FIG. 29 is a schematic view of a wave energy conversion system being deployed using an eighteenth embodiment of a deployment system according to the invention.

The eighteenth embodiment relates to deployment of a wave energy conversion system 100 which is illustrated in FIG. 29. This embodiment is a variation of the previous embodiment and is similar in that the body 116 is substantially circular in plan.

Further, the eighteenth embodiment also features an arrangement in which there is a plurality of pumps 132 circumferentially spaced with respect to each other at equal angular intervals. In this embodiment, each pump 132 has a dedicated tether 134. In the arrangement shown, there are four pumps 132 and correspondingly four tethers 134.

In the various embodiments, the unit 110 has two operating states, a first state in which the unit can float on the body of water to facilitate transit through the body of water along the surface thereof, and a second state in which the buoyant structure is submerged.

During deployment of the wave energy conversion system 100, after connection of the tether(s) 134 to the fixtures 164, the pumps) 132 are caused to move from an extended condition to a contracted condition to apply a pulling force to cause the unit 110 to move towards the second state; that is, contraction of the pump(s) causes the unit 110 to be pulled into the water. In other words, the unit 110 is caused to move towards the second operating state by application of the pulling force on the tether. In one arrangement, the pulling force may cause movement of the unit 110 from the first operating state to the second operating state. In another arrangement, the unit 110 may be caused to move from the first operating state into an intermediate state in which it is either partly or fully submerged (typically by causing a decrease in buoyancy prior to connection of the tether(s)), and thereafter the pulling force applied to move the unit 110 from the intermediate state into the second operating state.

The unit may, of course, be moved from the first operating state to the second operating state in any other appropriate way; for example, by varying the buoyancy of the buoyant structure to cause the unit to sink from the first operating state to the second operating state.

The pump may be movable from the contracted condition to the extended condition to allow the unit to move from the second state towards the first state; that is, extension of the pump may allow the unit to rise towards the water surface from the submerged condition. With this arrangement, the unit is allowed to ascend in the water in a controlled manner to return to the water surface.

It should be appreciated that the scope of the invention is not limited to the scope of the various embodiments described.

In the embodiments described, the deployments involve reticulated outputs in the form of electricity and potable water. There may be circumstances where there is not a requirement for both electricity and potable water; for example, there may be instances where only electricity is required and other instances where only potable water is required. In such circumstances, the wave energy conversion system, and the associated deployment system, can be varied as necessary to provide the required reticulated output.

Further, the wave energy conversion system, and the associated deployment system, may be configured to utilise the pressurised fluid in ways other than for generation of electricity and production of potable water.

The various embodiments described and illustrated each have certain deployment steps which are not necessarily described and illustrated in other embodiments. However, it should be understood that a deployment described and illustrated on any embodiment may be incorporated into any other embodiment where appropriate, whether or not that other embodiment has been described and illustrated herein. In particular, it should be understood that all features described and illustrated in relation to embodiments in which the body 116 is of elongate configuration can be applied equally (as appropriate) to embodiments in which the body 116 is of circular configuration when viewed in plan.

It should be appreciated that the scope of the invention is not limited to the scope of the embodiments described.

Modifications and variations such as would be apparent to the skilled addressee are considered to fall within the scope of the present invention.

Reference to positional descriptions, such as "upper", "lower", "top" and "bottom", are to be taken in context of the embodiment depicted in the figures, and are not to be taken as limiting the invention to the literal interpretation of the term but rather as would be understood by the skilled addressee.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A wave energy conversion system for harnessing wave energy in a body of water and converting the harnessed wave energy to pressurised fluid, the wave energy conversion system comprising a unit providing a buoyant structure responsive to wave motion in a submerged condition, a pump for producing pressurised fluid, and a tether adapted to be connected at one end thereof to the pump and at the other end thereof to a fixture located below the unit, whereby movement of the buoyant structure relative to the fixture in response to wave motion converts harnessed energy to pressurised fluid delivered by the pump, the unit comprising a body and a removable portion, the removable portion incorporating the pump, wherein the unit is adapted to be deployed by moving the tether end into coupling engagement with the fixture upon actuation of the pump in a manner causing movement of the tether into engagement with the fixture.

2. The wave energy conversion system according to claim 1, wherein the body is configured as a shell having an outer surface providing the buoyant structure, the outer surface being configured to be coupled with the body of water when in the submerged condition to respond to wave motion.

3. The wave energy conversion system according to claim 1, wherein the removable portion further incorporates apparatus operable by the pressurised fluid.

4. The wave energy conversion system according to claim 1, wherein the body is arranged to accommodate a plurality of removable portions.

5. The wave energy conversion system according to claim 1, comprising a plurality of pumps.

6. The wave energy conversion system according to claim 5, wherein there is at least one further tether arranged to be operably connected to a fixture below the unit.

7. The wave energy conversion system according to claim 6, wherein there is at least one further fixture arranged below the unit.

8. The wave energy conversion system according to claim 1, wherein coupling engagement between the tether and the fixture is provided by a coupling assembly comprising first and second coupling portions, one of which is associated with the tether and the other is associated with the fixture.

9. The wave energy conversion system according to claim 1, wherein the buoyant structure has a first buoyancy state and a second buoyancy state, wherein in the first buoyancy state the unit can float on the body of water to facilitate transit through the body of water along a surface thereof and wherein in the second buoyancy state the unit is submersible.

10. The wave energy conversion system according to claim 9, wherein the unit can transit through the body of water in both the first and second buoyancy states.

11. The wave energy conversion system according to claim 9, wherein the unit is caused to assume the first buoyancy state (whereby it can be moved through the body of water along the surface thereof) for transit involving transportation of the unit to, and from, a site of installation in the body of water.

12. The wave energy conversion system according to claim 1, further comprising provision for manoeuvrability and steering underwater.

13. The wave energy conversion system according to claim 12 wherein the provision comprises one or more thruster modules provided on the unit.

14. The wave energy conversion system according to claim 1, wherein the pressurised fluid is utilised for extraction of mechanical energy for conversion to electrical energy or potable water.

15. The wave energy conversion system according to claim 14, wherein the pressurised fluid is utilised for extraction of mechanical energy for conversion to electrical energy and the electrical energy is conveyed from the unit along one or more electrical reticulation lines.

16. The wave energy conversion system according to claim 14, wherein the pressurised fluid is utilised for extraction of mechanical energy for conversion to potable water and the potable water is conveyed from the unit along one or more water reticulation lines.

17. A method of deploying a wave energy conversion system comprising:
establishing a unit providing a buoyant structure responsive to wave motion, a pump, and a tether adapted to be operably connected between the pump and a fixture below the unit, whereby movement of the buoyant structure relative to the fixture in response to wave motion generates pressurised fluid;
moving the unit to an installation site in a body of water and into a position to locate the tether above a fixture to which the tether is adapted to be engaged;
actuating the pump causing an extension stroke thereof, causing relative movement of a tether into engagement with the fixture; and
submerging the unit in the body of water.

18. The method according to claim 17, wherein establishing the unit comprises arranging the unit in a first buoyancy state in which it can float on the body of water.

19. The method according to claim 17, wherein submerging the unit involves use of a means for controlling buoyancy.

20. The method according to claim 17, wherein the step of submerging the unit in the body of water comprises application of a pulling force on the tether.

21. The method according to claim 20, wherein the pulling force is applied to the tether by moving the pump from an extended condition to a contracted condition.

22. The method according to claim 17, further comprising providing the tether with an end adapted to be connected to the fixture, and wherein a relative movement of the tether end causes coupling engagement with the fixture.

23. The method according to claim 17, wherein establishing the unit further comprises attaching thruster modules to an exterior of the unit.

24. The method according to claim 17, wherein establishing the unit further comprises supplying an integral thruster system to the unit.

25. The method according to claim 17, further comprising manoeuvring and steering the unit underwater in a submerged state.

26. The method according to claim 17, further comprising connecting the unit to an electrical reticulation line to carry electricity away from the unit.

27. The method according to claim 26, further comprising positioning a plurality of buoyancy modules along a length of the electrical reticulation line, connecting and running the reticulation line to cause the reticulation line to descend to a floor of the body of water to a destination in a wave pattern.

28. The method according to claim 17, further comprising connecting the unit to a water reticulation line to carry potable water away from the unit.

29. The method according to claim 28, further comprising positioning a plurality of buoyancy modules along a length of the water reticulation line, connecting and running the reticulation line to cause the reticulation line to descend to a floor of the body of water to a destination in a wave pattern.

* * * * *